United States Patent
Llull et al.

(10) Patent No.: US 12,554,136 B2
(45) Date of Patent: Feb. 17, 2026

(54) COLOR CORRECTION FOR XR DISPLAY

(71) Applicant: Snap Inc., Santa Monica, CA (US)

(72) Inventors: Patrick Llull, Los Altos, CA (US); Miller Harry Schuck, III, Erie, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/676,140

(22) Filed: May 28, 2024

(65) Prior Publication Data
US 2025/0370258 A1    Dec. 4, 2025

(51) Int. Cl.
G02B 27/01    (2006.01)
G09G 3/20    (2006.01)

(52) U.S. Cl.
CPC ......... G02B 27/017 (2013.01); G09G 3/2003 (2013.01); *G02B 2027/0112* (2013.01)

(58) Field of Classification Search
CPC ......... G09G 3/2003; G09G 2320/0242; G09G 2320/0285; G09G 2320/0693; G02B 27/0172; G02B 27/017; G02B 2027/0112
See application file for complete search history.

(56) References Cited

U.S. PATENT DOCUMENTS

| | | | |
|---|---|---|---|
| 6,411,047 B1 | 6/2002 | Okazaki et al. | |
| 7,262,753 B2 | 8/2007 | Tanghe et al. | |
| 7,884,832 B2 | 2/2011 | Alessi et al. | |
| 7,969,430 B2 | 6/2011 | Korcharz et al. | |
| 9,336,746 B2 | 5/2016 | Oda | |
| 9,865,226 B2 | 1/2018 | Buckett et al. | |
| 10,062,334 B2 | 8/2018 | You et al. | |
| 10,847,075 B1 | 11/2020 | Buckley et al. | |
| 10,957,235 B1 | 3/2021 | Buckley | |
| 11,043,164 B2 | 6/2021 | Leerentveld et al. | |
| 11,250,810 B2 * | 2/2022 | Buckley | H04N 1/52 |
| 11,263,729 B2 | 3/2022 | Margolis et al. | |
| 11,302,234 B2 | 4/2022 | Buckley | |
| 11,347,056 B2 | 5/2022 | Robbins et al. | |
| 11,410,580 B2 | 8/2022 | Buckley et al. | |

(Continued)

OTHER PUBLICATIONS

"U.S. Appl. No. 18/676,225, Corrected Notice of Allowability mailed Aug. 1, 2025", 2 pgs.

(Continued)

*Primary Examiner* — Xuemei Zheng
(74) *Attorney, Agent, or Firm* — Schwegman Lundberg & Woessner, P.A.

(57) ABSTRACT

Display systems, media, and methods. Pixels of an image former form an image. Each pixel has a first color element to propagate a first amount of a first light having a first wavelength, based on a first electrical stimulus, and a second color element to propagate a second amount of a second light having a second wavelength, based on a second electrical stimulus. A display surface presents the image across a plurality of display surface locations. A processor executes instructions to scale the first electrical stimulus of each pixel of the image former by a first light scale factor, scale the second electrical stimulus of each pixel of the image former by a second light scale factor, and apply a pixel shading map to the image former to independently adjust, for each pixel of the display, the first amount relative to the second amount.

20 Claims, 17 Drawing Sheets

(56) References Cited

U.S. PATENT DOCUMENTS

| | | | |
|---|---|---|---|
| 11,626,057 B1 | 4/2023 | Park et al. | |
| 11,681,363 B2 | 6/2023 | Buckley | |
| 11,705,029 B1 | 7/2023 | Zhang et al. | |
| 11,754,846 B2* | 9/2023 | Buckley | G06F 3/147 |
| | | | 345/7 |
| 11,929,040 B2 | 3/2024 | Johannessen | |
| 12,112,695 B2 | 10/2024 | Thielemans et al. | |
| 12,142,207 B2 | 11/2024 | Gao et al. | |
| 12,190,773 B2 | 1/2025 | Hai | |
| 12,205,526 B2 | 1/2025 | Lee et al. | |
| 12,243,463 B2 | 3/2025 | Lee et al. | |
| 2013/0257835 A1 | 10/2013 | Bell | |
| 2014/0333648 A1 | 11/2014 | Ouchi | |
| 2016/0187654 A1* | 6/2016 | Border | G02B 27/0172 |
| | | | 359/630 |
| 2018/0129050 A1* | 5/2018 | Hayashi | H04N 9/3182 |
| 2020/0267359 A1 | 8/2020 | Seiler et al. | |
| 2021/0125577 A1* | 4/2021 | Hong | G09G 3/2003 |
| 2021/0407365 A1* | 12/2021 | Messer | G09G 3/2003 |
| 2022/0099975 A1* | 3/2022 | Schultz | G09G 3/36 |
| 2022/0133140 A1 | 5/2022 | Kojima | |
| 2022/0308661 A1 | 9/2022 | Buckley | |
| 2022/0366820 A1 | 11/2022 | Goswami et al. | |
| 2023/0245610 A1* | 8/2023 | Kim | G06T 7/90 |
| | | | 345/690 |
| 2023/0290290 A1 | 9/2023 | Shams et al. | |
| 2023/0298541 A1 | 9/2023 | Rangaprasad et al. | |

OTHER PUBLICATIONS

"U.S. Appl. No. 18/676,225, Notice of Allowance mailed Jul. 28, 2025", 10 pgs.

"International Application Serial No. PCT/US2025/029534, International Search Report mailed Sep. 19, 2025", 5 pgs.

"International Application Serial No. PCT/US2025/029534, Invitation to Pay Additional Fees mailed Jul. 29, 2025", 11 pgs.

"International Application Serial No. PCT/US2025/029534, Written Opinion mailed Sep. 19, 2025", 9 pgs.

"International Application Serial No. PCT/US2025/030535, International Search Report mailed Jul. 25, 2025", 3 pgs.

"International Application Serial No. PCT/US2025/030535, Written Opinion mailed Jul. 25, 2025", 10 pgs.

"U.S. Appl. No. 18/676,225, Notice of Allowance mailed Mar. 24, 2025", 11 pgs.

* cited by examiner

COLOR CORRECTION FOR XR DISPLAY

TECHNICAL FIELD

The present disclosure relates generally to display devices and more particularly to display devices and systems used for extended reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects or other content (e.g., virtual objects such as 3D renderings, images, video, text, and so forth) that are generated for display to appear as a part of, and/or overlaid upon, the surrounding environment (referred to collectively as "virtual content"). This is typically referred to as "extended reality" or "XR", and it encompasses techniques such as augmented reality (AR), virtual reality (VR), and mixed reality (MR). Each of these technologies combines aspects of the physical world with virtual content presented to a user.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

XR displays are typically categorized as virtual reality displays, video pass-through displays, or optical see-through displays. In virtual reality displays, a virtual environment is presented to the user's eyes, and the real-world physical environment is obscured. In video pass-through, a view of the physical environment is captured by a camera, combined with virtual content, and then presented to the user on an opaque display. In optical see-through, a user views the physical environment directly through transparent or translucent displays which interpose virtual content between the user's eyes and the physical environment. Optical see-through XR displays often use waveguides to propagate projected light across surfaces of the display and toward the user's eyes, and such waveguides can give rise to certain non-uniformities of brightness and/or color distribution across different regions of a virtual image surface where the image is presented, formed, or illuminated by the waveguide. Examples described herein may attempt to address the technical problem of color non-uniformity in waveguide displays (e.g., see-through XR displays). Some examples may be applicable to non-waveguide displays as well.

By providing techniques for correcting color non-uniformity in displays, examples described herein may address one or more technical problems related to XR. In some examples, the realism and/or accuracy of images presented by a display may be improved. Color non-uniformity, which may result in "color rainbows" of successive regions having different white points for the presented image, is distracting and destroys the presentation of flat colors (e.g., a field of uniform color in a presented image may instead appear as a collection of multi-colored stripes or blobs). This may have particularly acute effects in certain visual applications, such as presenting images of humans (whose skin tone appears unnatural) or presenting images of clothing or decorations to an XR user attempting to match colors with real-world visual content. In addition, different patterns of color non-uniformity in images presented to the user's left and right eyes by a binocular display can result in chromatic binocular rivalry, which can cause visual discomfort. Each of these undesired effects can potentially be mitigated or eliminated by techniques for correcting color non-uniformity. Other technical solutions and features will be appreciated based on the figures, description, and claims herein.

Figure 1:
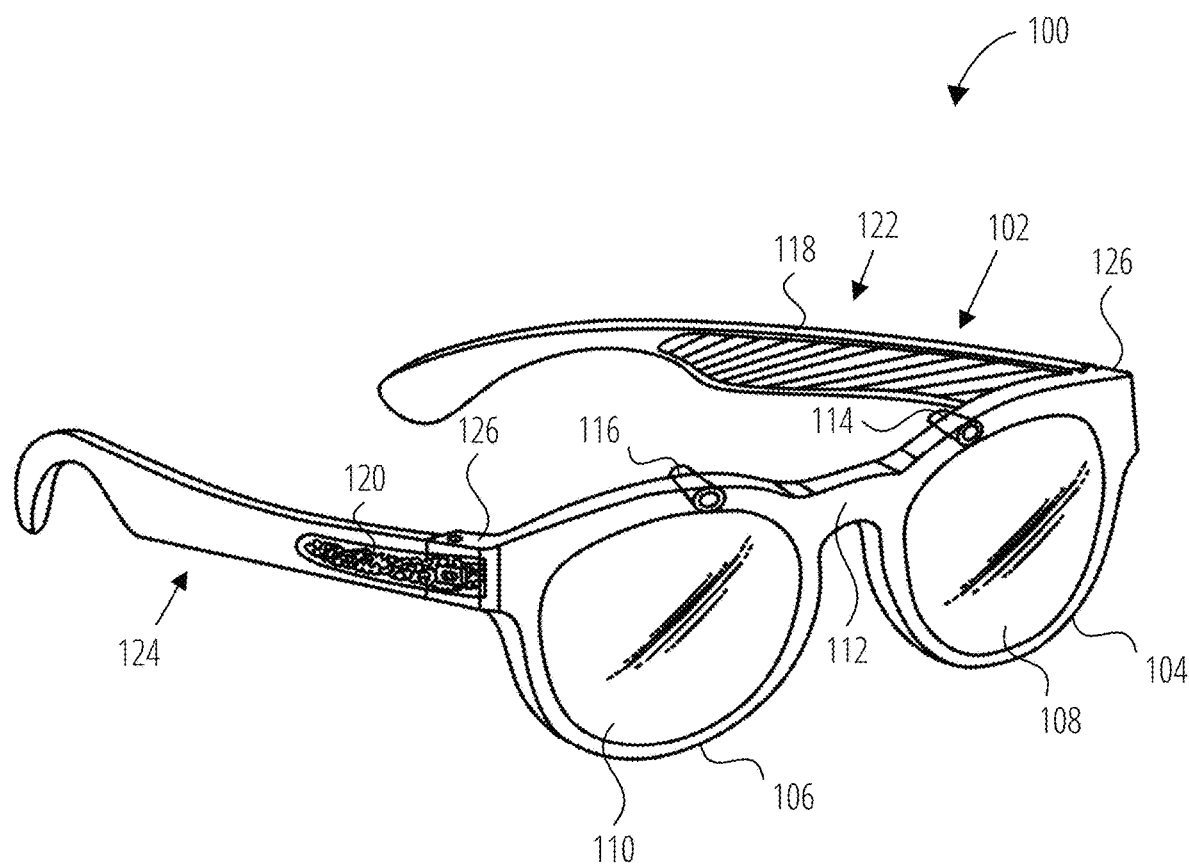
FIG. 1 is a perspective view of a head-worn device, in accordance with some examples.

FIG. 1 is perspective view of a head-worn XR device (e.g., a display system 100 shown as XR glasses), in accordance with some examples. The display system 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 (e.g., a display or lens holder) connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the display system 100. The right optical element 110 and the left optical element 108 can each be considered to provide a display configured to present an image at a virtual image surface having a plurality of virtual image surface locations, as described below with reference to FIG. 2.

The frame 102 additionally includes a left arm or temple piece 122 and a right arm or temple piece 124. In some examples the frame 102 can be formed from a single piece of material so as to have a unitary or integral construction.

The display system 100 can include a computing device, such as a computer 120 having a processor and a memory storing instructions for execution by the processor. The computer 120 can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. Various other examples may include these elements in different configurations or integrated together in different ways. In some examples, the computer 120 can be implemented by a machine 1600 or machine 1704 as described below with reference to FIG. 16 or FIG. 17.

The computer 120 additionally includes a battery 118 or other suitable portable power supply. In some examples, the battery 118 is disposed in left temple piece 122 and is electrically coupled to the computer 120 disposed in the right temple piece 124. The display system 100 can include a connector or port (not shown) suitable for charging the battery 118, a wireless receiver, transmitter or transceiver (not shown), or a combination of such devices.

The display system 100 can include a first or left camera 114 and a second or right camera 116. Although two cameras are depicted, other examples contemplate the use of a single or additional (i.e., more than two) cameras. In one or more examples, the display system 100 can include any number of input sensors or other input/output devices in addition to the left camera 114 and the right camera 116, such as location sensors, motion sensors, and so forth. It will be appreciated that the cameras 114, 116 are a form of optical sensor, and that the display system 100 may include additional types of optical sensors in some examples.

Figure 2:
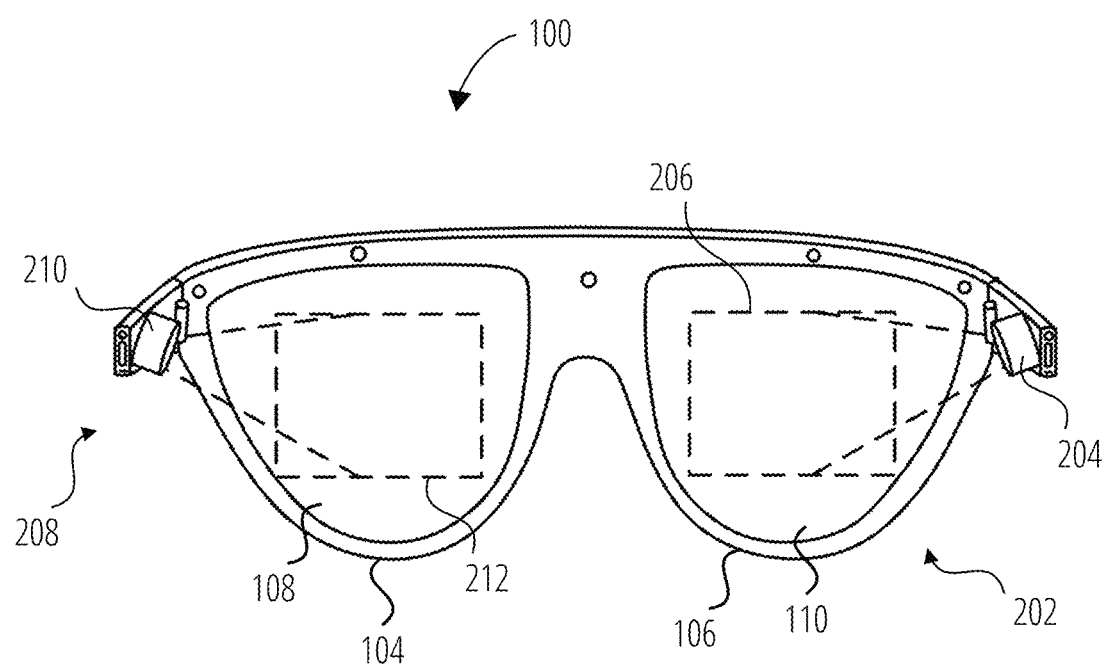
FIG. 2 illustrates a further view of the head-worn device of FIG. 1, in accordance with some examples.

FIG. 2 illustrates the display system 100 from the perspective of a user. For clarity, a number of the elements shown in FIG. 1 have been omitted. As described in FIG. 1, the display system 100 shown in FIG. 2 includes left optical element 108 and right optical element 110 secured within the left optical element holder 104 and the right optical element holder 106, respectively.

The display system 100 include right forward optical assembly 202 comprising a right projector 204 and a right display device 206, and a left forward optical assembly 208 including a left projector 210 and a left display device 212. The right forward optical assembly 202 (with or without right optical element 110) may be referred to herein as a right near-eye display, the left forward optical assembly 208 (with or without left optical element 108) may be referred to herein as a left near-eye display, and each may be referred to herein as a near-eye display or a near-eye optical see-through XR display.

In some examples, the display devices 206 are waveguides. The waveguides include reflective or diffractive structures (e.g., gratings and/or optical elements such as mirrors, lenses, or prisms). Projected light emitted by the projector 204 encounters the diffractive structures of the waveguide of the display device 206, which directs the light towards the right eye of a user to provide an image (e.g., a right-eye image) on or in the right optical element 110 that overlays the view of the real world seen by the user. Similarly, projected light emitted by the projector 210 encounters the diffractive structures of the waveguide of the display device 212, which directs the light towards the left eye of a user to provide an image (e.g., a left-eye image) on or in the left optical element 108 that overlays the view of the real world seen by the user. The combination of a GPU, the right forward optical assembly 202, the left optical element 108, and the right optical element 110 provide an optical engine of the display system 100. The display system 100 uses the optical engine to generate an overlay of the real world view of the user including display of a 3D user interface to the user of the display system 100. The surface of the optical element 108 or 110 from which the projected light exits toward the user's eye is referred to as a user-facing surface, an image presentation surface, or a display surface of the near-eye optical see-through XR display. The light exits the image presentation surface of the waveguide at one or more exit pupil locations; at each exit pupil location, the different portions of the image exit at different angles. As a result of the angles at which the light exits the exit pupils toward the user's eye, the image is perceived by a user as extending across a surface in space, referred to herein as a virtual image surface. The virtual image surface is a surface in physical space where the user's eyes converge and focus to view the image; thus, the position and shape of the virtual image surface is a function of the physical properties of the light propagating from the waveguide surface toward the user's eyes.

It will be appreciated that other display technologies or configurations may be utilized within an optical engine to display an image to a user in the user's field of view. For example, instead of a projector 204 and a waveguide, a liquid crystal display (LCD), light emitting diode (LED) array, or other display type may be provided. In some examples, one or more liquid crystal on silicon (LCOS) panels may be used to modulate reflection of light of one or more colors to define individual pixels of the images presented by each display and thereby propagate the colors of light forming the images to various locations across one or more virtual image surfaces. In some examples, one or more LED arrays may be used to emit light of one or more colors from each of an array of LED pixels, thereby propagating the light of one or more colors to various display surface locations. In display types using a conventional 2D screen to present light toward the user's eyes, the virtual image surface can be considered to be identical to the 2D surface of the screen.

In use, a user of the display system 100 will be presented with information, content and various 3D user interfaces on the near eye displays. As described in more detail herein, the user can then interact with the display system 100 using the buttons 126, voice inputs or touch inputs on an associated device, and/or hand movements, locations, and positions detected by the display system 100.

Figure 3:
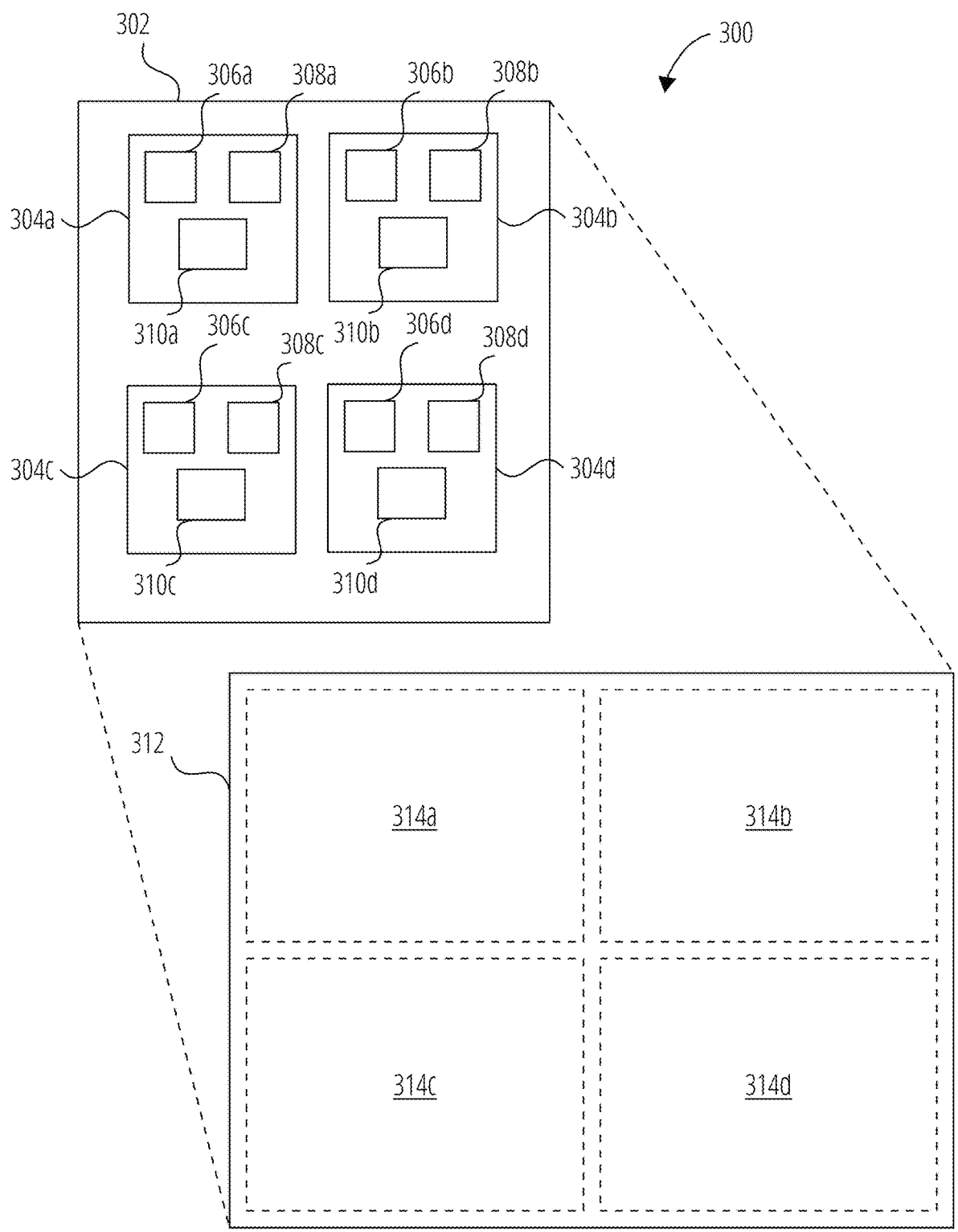
FIG. 3 illustrates a block diagram of an example display showing pixels of an image former mapped to a virtual image surface, in accordance with some examples.

FIG. 3 shows a simplified block diagram of a display 300 having an image former 302 and a virtual image surface 312. The image former 302 includes a simplified array of pixels 304a, 304b, 304c, and 304d-whereas only four pixels are shown in the drawing for clarity, it will be appreciated that some examples can include much larger pixel arrays having thousands or millions of pixels. Each pixel has three elements configured to propagate light of each of three wavelengths: a first color element 306a, 306b, 306c, or 306d configured to propagate first light of a first wavelength (e.g., blue light having a dominant or center wavelength of 450 to 495 nanometers (nm)), a second color element 308a, 308b, 308c, or 308d configured to propagate second light of a second wavelength (e.g., green light having a dominant or center wavelength of 500 to 570 nm), and a third color element 310a, 310b, 310c, or 310d configured to propagate third light of a third wavelength (e.g., red light having a dominant or center wavelength of 620 to 750 nm).

In various examples, the pixels of the image former may be defined by one or more of the image forming technologies described above. In some examples, a given pixel (e.g., 304a) can be implemented by one or more light sources and a region of one or more LCOS panels, such as red, green, and blue light sources and a region of a single LCOS panel configured to modulate the reflectance of light over three time periods corresponding to three color sub-frames of a color sequential display. In some examples, a given pixel can be implemented by a red-green-blue (RGB) LED pixel having a blue light emitter, a green light emitter, and a red light emitter. In some examples, a given pixel can be implemented by corresponding regions of three transmissive LCD panels configured to transmit light of each of the three colors. It will be appreciated that any suitable means of forming a multicolored image can be used to implement the image former 302 in various examples. Each colored light element (e.g., first color element 306a) of a pixel is configured to propagate (e.g., through transmission, reflection, emission, diffraction, or other means) varying amounts of light of each of the three colors. The amount of light that a given colored light element propagates can be modulated by the application of an electrical stimulus to the colored light element. For example, a backplane circuit of an LED array may apply a first electrical stimulus (e.g., a first current or voltage) to the first color element 306a to drive the first color element 306a to emit a first amount of the first light, apply a second electrical stimulus (e.g., a second current or voltage) to the second color element 308a to drive the second color element 308a to emit a second amount of the second light, and apply a third electrical stimulus (e.g., a third current or voltage) to the third color element 310a to drive the third color element 310a to emit a third amount of the third light. By varying the relative values (e.g., current or voltage values) of the first electrical stimulus, second electrical stimulus, and third electrical stimulus, the color mix of the light propagated by the pixel 304a can be modulated. In an image former 302 that uses a single light source of each color, such as a color-sequential LCOS-based display having a single red light source, a single green light source, a single blue light source, and an LCOS panel with multiple pixels configured to modulate reflectance over time periods corresponding to three color sub-frames, the first electrical stimulus, second electrical stimulus, and third electrical stimulus can be regarded as current or voltage stimuli to the three colored light sources, in combination with currents or voltages applied to regions of the LCOS panel to modulate reflectivity at different times.

The image former 302 propagates light to form the image. The light forming the image is propagated (e.g., via a projector and waveguide, or via presentation through or on an LCD or LED display panel) to a display surface, such as an eye facing surface of the waveguide, to form the image at a virtual image surface 312. The pixels forming the image are mapped to corresponding virtual image surface locations: in the illustrated example, pixel 304a corresponds to virtual image surface location 314a, pixel 304b corresponds to virtual image surface location 314b, pixel 304c corresponds to virtual image surface location 314c, and pixel 304d corresponds to virtual image surface location 314d. Thus, the color mix of the light propagated by a given pixel ideally results in light having the same color mix presented to a user from the corresponding virtual image surface location.

However, in some cases the various colors of light propagated from each pixel do not propagate to the corresponding virtual image surface locations ideally or homogeneously. Light can be lost or distorted, and this loss or distortion can be non-uniform with respect to different display surface locations, to different viewing angles, and to different colors of light. Such losses and distortions can result in non-uniformity of the color of light presented at different virtual image surface locations, such that the white point of the image is different at different virtual image surface locations. Such color non-uniformity can have various negative effects, as described above.

Losses or distortions in the propagation of light to the display surface, thereby distorting the presentation of light from the virtual image surface, can arise due to various factors specific to the display technology being used. In the context of waveguides having diffractive optical structures for coupling light out of the display surface of the waveguide, different colors of light may interact with the diffractive optical structures according to different patterns according to the wavelengths of the light: for example, blue light having a relatively short wavelength may have a relatively steep angle of total internal reflection within the waveguide, resulting in a greater number of interactions with the diffractive optical structures relative to light having longer wavelengths (e.g., green or red light) over the same area of the waveguide surface. This can result in larger amounts of blue light exiting the waveguide in the proximity of an input region near the light source, compared to the amounts of green and red light exiting the waveguide in the proximity of an input region. By the same token, because of this relatively large amount of blue light leakage near the light input, the amount of blue light exiting the waveguide in regions distal from the light source may be correspondingly diminished relative to green and red light, as the blue light is exhausted relatively closer to the input. Other loss or distortion effects affecting the propagation of light through and/or out of the waveguide at various display surface locations and at various angles can cause other non-uniformities of one or more of the colors of light based on the optical and structural details of the diffractive optical elements used, the materials used for the waveguide, and other design factors.

One source of loss or distortion giving rise to color non-uniformity in waveguide-based displays is described below with reference to FIG. 6 and FIG. 7. Examples of non-uniform color effects are described with reference to FIG. 8 through FIG. 11. Examples of techniques for correcting these color non-uniformities are described with reference to FIG. 12 through FIG. 15. Finally, examples of machines, systems, and software architectures for implementing the techniques described herein are described with reference to FIG. 16 and FIG. 17.

Figure 4:
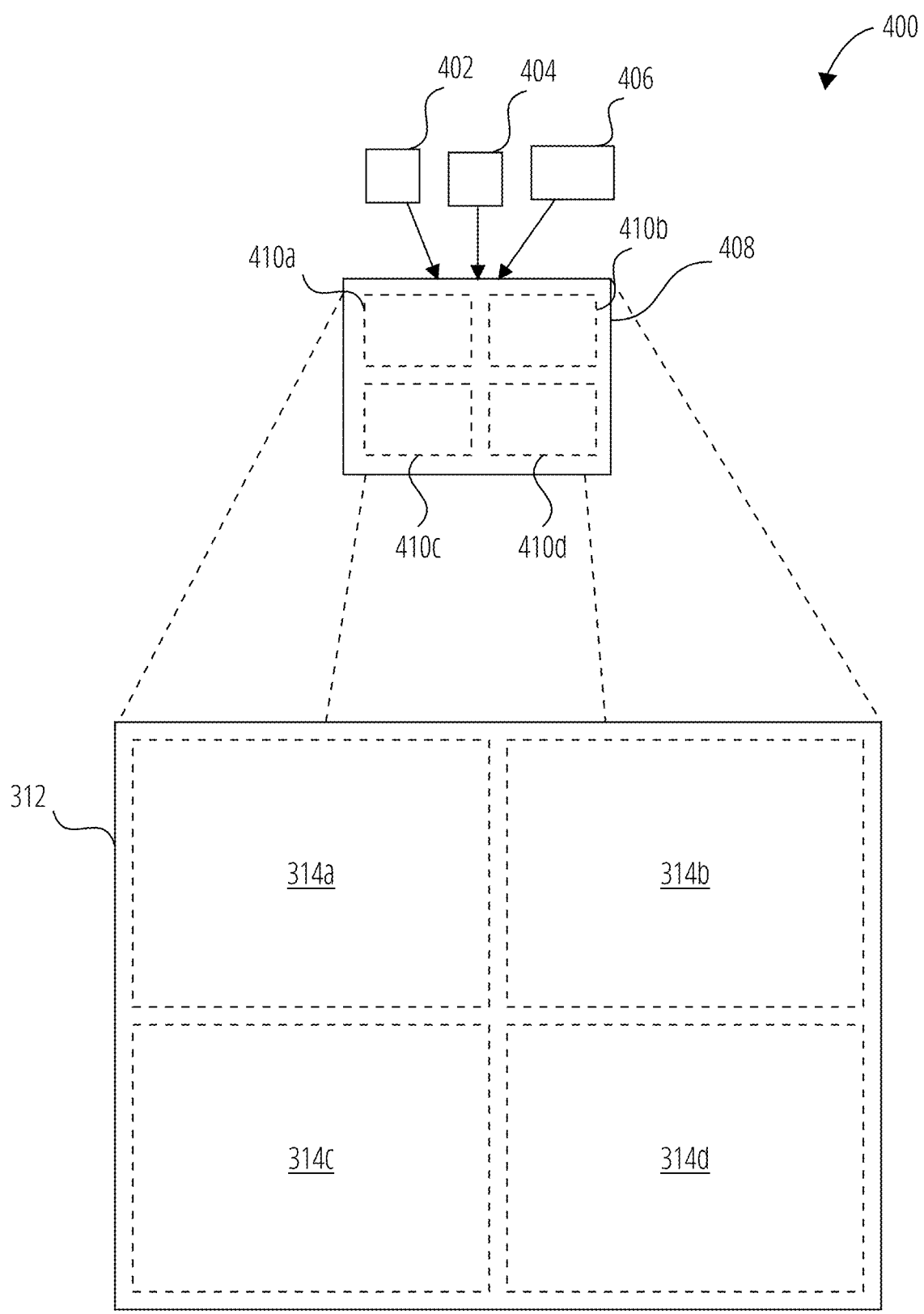
FIG. 4 illustrates a block diagram of a second example display showing color-specific emitters and pixels of an image former mapped to a virtual image surface, in accordance with some examples.

FIG. 4 illustrates a block diagram of a second example display 400 showing three color-specific emitters (first color emitter 402, second color emitter 404, and third color emitter 406), emitting light formed by pixels 410a-410d of an image former 408 to form an image, which is mapped to a virtual image surface 312. Similar to the pixels 304a to 304d of the display 300, the pixels 410a to 410d of the display 400 are mapped, respectively, to virtual image surface locations 314a to virtual image surface location 314d.

Unlike the first example display 300 shown in FIG. 3, which is intended to cover several display types as describe above, this display 400 explicitly separates the emitters from the image former 408. Each color-specific emitter 402 to 406 can be a colored light emitter, such as a colored LED or an array of same-colored LEDs. The image former 408 can be an array of liquid crystal elements configured to selectively modulate reflectance and/or transmission of light in order to form an image from the light emitted by one or more of the color-specific emitters 402 to 406. In some examples, the display 400 is an RGB LCOS display configured to emit red, green, and blue light from the three color-specific emitters (e.g., first color emitter 402 may be a blue LED, second color emitter 404 may be a green LED, and third color emitter 406 may be a red LED) and selectively reflect the light from liquid crystal pixels 410a-410d of an LCOS panel implementing image former 408 to form an image. The image can be projected or otherwise propagated via the display surface to illuminate the virtual image surface 312, e.g., by a waveguide having input and output diffractive elements.

The display 400 can operate as a color sequential display employing field sequential color techniques to project or otherwise propagate an RGB color image. For example, the first color emitter 402, second color emitter 404, and third color emitter 406 may be stimulated in sequence, such that the first color emitter 402 emits light during a first color sub-frame time period, the second color emitter 404 emits light during a second color sub-frame time period, and the third color emitter 406 emits light during a third color sub-frame time period. In some examples, the magnitude of the electrical stimulus applied to each emitter 402 to 406 during its respective color sub-frame time period, and/or the duration of each color sub-frame time period, can be independently controlled to modulate the amount of each color of light emitted during a frame (a frame encompassing at least one color sub-frame time period for each emitted color of light).

Figure 5:
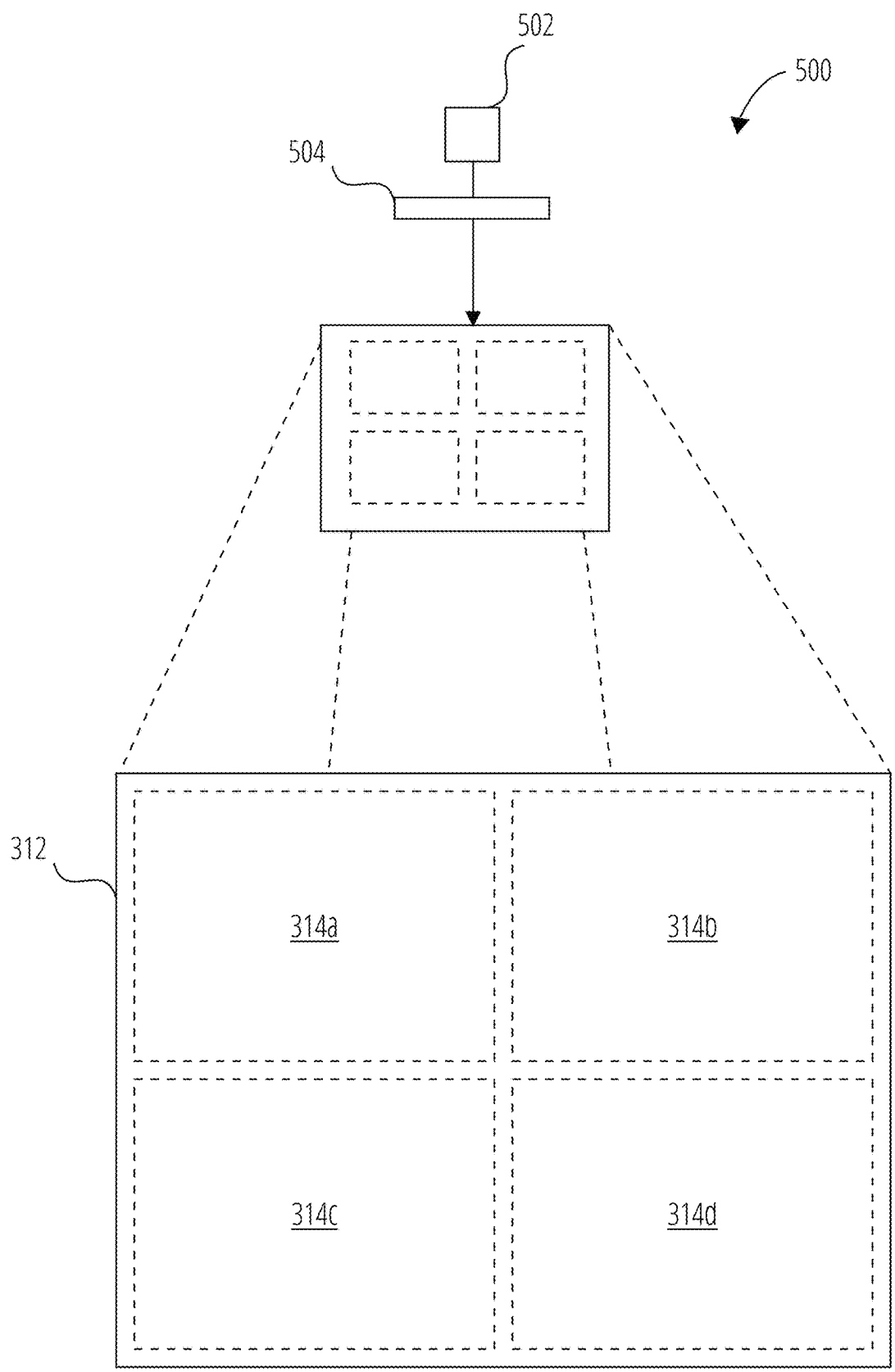
FIG. 5 illustrates a block diagram of a third example display showing a white light emitter, a color wheel, and pixels of an image former mapped to a virtual image surface, in accordance with some examples.

FIG. 5 illustrates a block diagram of a third example display 500 showing a white light backlight emitter 502, a color wheel 504, an image former 408, and a virtual image surface 312. In this example, the image former 408 and virtual image surface 312 operate as in the display 400 of FIG. 4. However, the sequential propagation of the different colors of light is enabled by a color wheel 504 or other multi-color filter, which interposes different colored filters between the backlight emitter 502 and the image former 408 during the different color sub-frame time periods. As described with reference to the display 400 above, the magnitude of the electrical stimulus applied to the backlight emitter 502 during each color sub-frame time period, and/or the duration of each color sub-frame time period, can be independently controlled to modulate the amount of each color of light propagated to the image former 408 during a frame.

Figure 6:
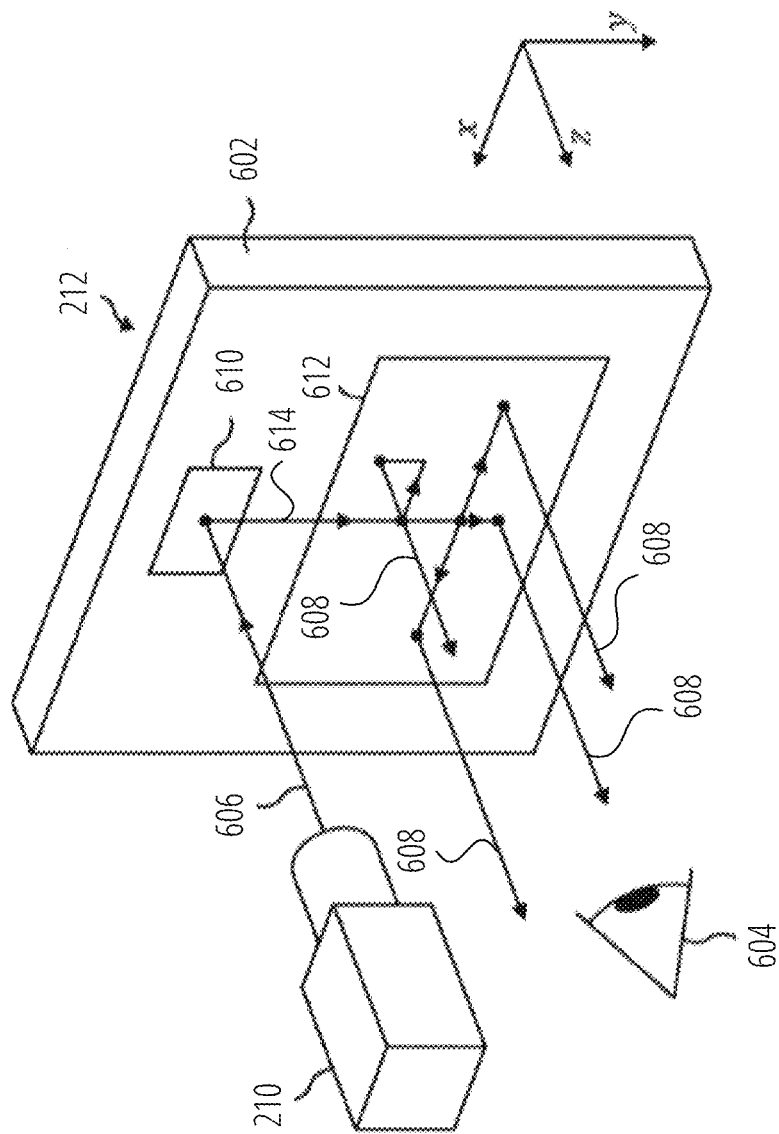
FIG. 6 illustrates a perspective view of the left projector, the light, and the left near eye display of FIG. 2, in accordance with some examples.

FIG. 6 shows a perspective view of the left projector 210, the projected light 606 (represented in FIG. 6 as a single ray), and the left display device 212 of FIG. 2. The corresponding elements for the right eye can have a similar construction and function.

The left display device 212 can include a waveguide 602 or light guide. The waveguide 602 can guide light via repeated total internal reflections from opposing light-guiding surfaces of the waveguide 602. In the configuration of FIG. 6, the waveguide 602 can be configured as a planar waveguide or a slab waveguide, such as disposed in the x-y plane. The light-guiding surfaces can be generally flat or planar surfaces that are parallel to each other and extend in the x-y plane. One of the light-guiding surfaces (e.g., the display surface) can face an eye 604 of the user. The other of the light-guiding surfaces can face away from the eye 604 of the user.

The waveguide 602 can include one or more diffractive and/or reflective structures, which can receive the projected light 606 from the left projector 210, redirect the projected light 606 internally within the waveguide 602, and extract the projected light 606 from the waveguide 602 to form exiting light 608. For example, the waveguide 602 can include one or more diffraction gratings and/or diffraction grating regions, such as a single diffraction grating structure that has individual regions that can function as if they were separate diffraction gratings. The waveguide 602 can include one or more reflective structures, such as mirrors, prisms, and/or reflective gratings. The waveguide 602 can include one or more transmissive structures, such as transmissive gratings. The waveguide 602 can optionally include one or more light-focusing (or collimating-changing) optical elements, such as lenses. Any or all of these structures or elements can be included on one or both light-guiding surfaces of the waveguide 602 or in an interior of the waveguide 602.

In the configuration of FIG. 6, the waveguide 602 can include an input grating 610, which can receive the projected light 606 from the left projector 210 and direct the projected light 606 into the waveguide 602 to form light 614. The waveguide 602 can include an output grating 612, which can receive the light 614, split and redirect the light 614 internally to extend over a relatively large area (compared to the input grating 610), and direct the light 614 out of the waveguide 602 to form the exiting light 608. The redirections and splitting can occur from multiple (sequential) interactions with a single diffraction grating, or from sequential interactions with different gratings that are disposed within the surface area of the output grating 612. For example, a light ray can be diffracted into the waveguide by the input grating 610 and be caused to totally internally reflect from one light-guiding surface of the waveguide 602 to the other in a direction toward the output grating 612. The light 614 may then interact with diffractive features of the output grating 612 on or within the waveguide. A portion of light 614 is diffracted laterally within the plane of the waveguide thereby replicating the image across the area of the output grating 612, due to multiple interactions with diffractive features that exist across the output grating 612. Another portion of light 614 is directed out of the waveguide by diffraction grating 612 toward the eye 604 as light 608. The interactions with the diffractive features of the output grating 612 can cause internal rays or internal light beams in the waveguide 602 to change direction within the waveguide 602. Eventually, the interactions with the diffractive features can cause the internal rays or internal light beams to exit the waveguide 602 to propagate toward the eye 604 of the user.

In some examples, the waveguide 602 can be configured to operate at infinite conjugates. For example, the left projector 210 may project light that forms an image infinitely far away, so that the light would appear in focus on a screen placed relatively far from the left projector 210. Similarly, the output grating 612 may direct the exiting light 608 toward the eye in such a manner that the image appears to be infinitely far away to the eye 604 of the user. For such an infinite-conjugate arrangement, angles in the space of the light that enters and exits the waveguide 602 can correspond uniquely to image locations in the image. For example, the propagation angles of the light can map uniquely to the propagation angles of the exiting light 608, which in turn can map uniquely to the image locations in the image at the retina of the eye 604 of the user.

The waveguide 602 can make use of this infinite-conjugate relationship to perform so-called "pupil replication" or "pupil expansion". The left projector 210 can be configured to have an exit pupil that coincides with the input grating 610. The internal splitting and redirections within the output grating 612 can effectively expand a surface area of the exit pupil, while maintaining the unique mapping of propagation angle to image location for light in the pupil, and thereby maintaining the unique mapping of virtual image surface location to image location. The size of the output grating 612 (e.g., an area covered by the replicated pupils, as constrained within a surface area of the output grating 612) can be larger than a pupil of the eye 604 of the user, so that if the pupil of the eye 604 moves, such as caused by the user changing a gaze direction, the amount of light entering the pupil of the eye 604 may not vary significantly, and the user may not perceive a change in brightness of the image.

Thus, in the context of a waveguide-based display, the mapping of image pixels to virtual image surface locations shown in FIG. 3 can be more specifically considered to be a mapping of light propagated from image pixels to light presented from a given display surface location at an angle that intersects the user's eye (or more specifically, the pupil of the user's eye). References herein to measuring or correcting the color mix of light presented from a given virtual image surface location may be understood, in the context of waveguide-based displays, to measuring or correcting the color mix of light presented from the given display surface location at an angle intersecting a point or region in space corresponding to a real or hypothetical pupil of an eye.

Figure 7:
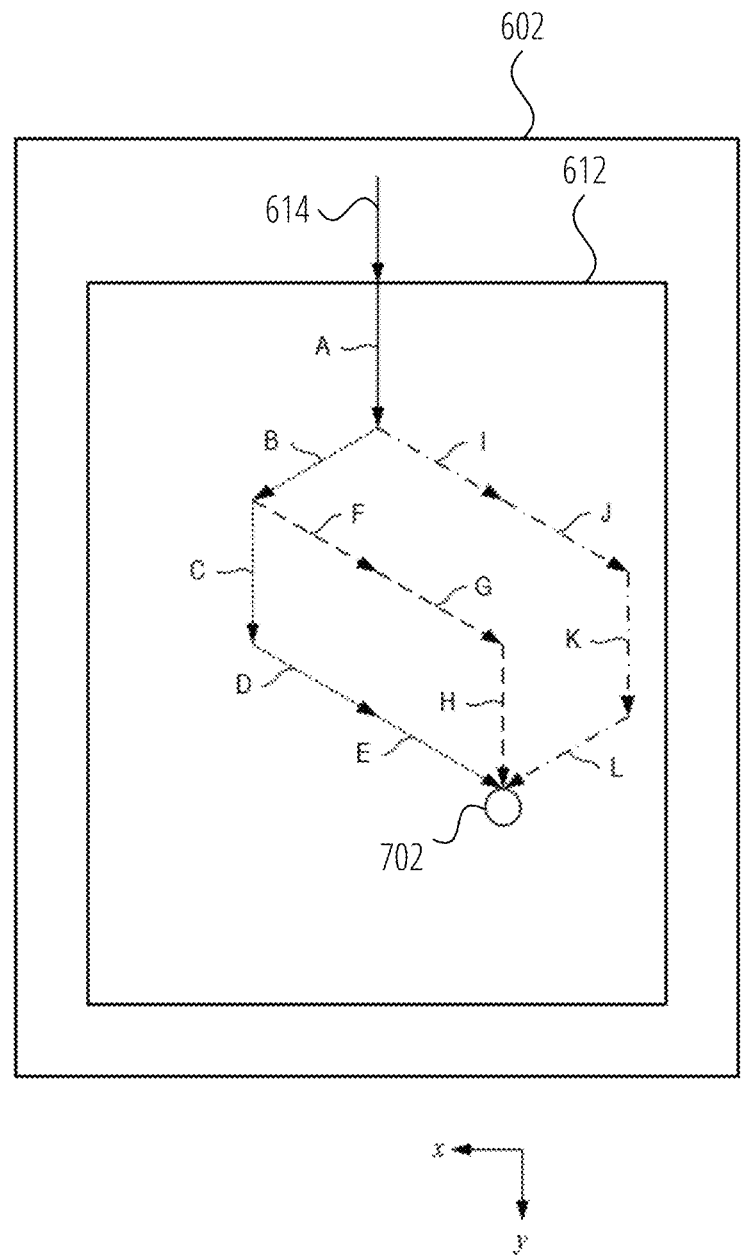
FIG. 7 illustrates a front view of the output grating of FIG. 6, with examples of optical paths traversed by light rays in the waveguide within a footprint or perimeter of the output grating, in accordance with some examples.

FIG. 7 shows a front view of the output grating 612 of FIG. 6, with examples of optical paths traversed by light rays in the waveguide 602 within a footprint or perimeter of the output grating 612. Light 614 in the waveguide 302 arrives from the input grating 610 (FIG. 3), propagates in the waveguide 602 to enter the perimeter of the output grating 612, splits and propagates in the waveguide 602 while within the perimeter of output grating 612, and exits the waveguide 602 and exits the output grating 612 at location 702.

Because the light splits within the perimeter of the output grating 612, the light may form multiple beams in the waveguide 602 while within the perimeter of the output grating 612. In the example of FIG. 7, a single beam splits to form two beams, and one of those two beams splits to form a further two beams, so that the single beam ultimately produces three beams in the waveguide 602 within the perimeter of the output grating 612. In FIG. 7, a first beam traverses segments A-B-C-D-E, a second beam traverses segments A-B-F-G-H, and a third beam traverses segments A-I-J-K-L. Segments A through L in FIG. 7 illustrate repetitions of propagation vectors in the waveguide 602. The segments A through L begin and end at locations at which the light beams interact with diffractive features of the output grating 612. Specifically, the first beam propagates within the waveguide 602 to location A, reflects from location A to remain within the waveguide 602, totally internally reflects from an opposing light-guiding surface of the waveguide, propagates within the waveguide 602 to location B, reflects and is diffracted from location B to remain within the waveguide 602, and so forth.

The multiple beams can recombine upon exiting the waveguide 602 and exiting the output grating 612 at location 702. In the example of FIG. 7, the three beams combine at location 702 and, together as a single beam of exiting light 608 (FIG. 6), propagate toward the eye 604 (FIG. 6) of the user. In some configurations, the guided light in the waveguide 602 (FIG. 6) can be a single wavelength or a range of wavelengths corresponding to standard light-emitting diode (LED) spectra, such as red, blue, or green LED spectra. (In practice, the display system 100 may use multiple waveguides to produce full-color images, such as a waveguide for guiding only red light, a waveguide for guiding only green light, and a waveguide for guiding only blue light. Such imaging systems may spectrally split the light from a single projector, or may use multiple projectors, each producing light at a different wavelength or color. Such imaging systems may combine the single-color light to form a full-color image. Individual waveguides for red, green and blue light may have different thicknesses such that each wavelength follows a similar walk path during internal reflection, leading to a near equal number of internal reflections per color.)

Because multiple beams of the same wavelength can recombine to form the exiting light 608 (FIG. 6), there can be interference effects among the multiple beams. Such interference effects are sensitive to changes in optical path length, with path length differences of greater than about one-eighth of a wavelength producing relatively large changes in output beam intensity. This sensitivity of output beam intensity to interference effects can be problematic, and can lead to non-uniformities in the image presented to the viewer. These non-uniformities can vary by wavelength of light (due to, e.g., varying sensitivity of different wavelengths of light to such path length differences), thereby giving rise to color non-uniformities as described above. For example, the sensitivity to optical interference may cause the device to show an exaggerated sensitivity to temperature that gives rise to color non-uniformity effects. As one example, a particularly hot electrical element may produce a hot spot in the surface area of the output grating 612. That hot spot may change the path length locally in one region of the output grating 612, so that optical paths near the hot spot may vary in optical path length, while other paths away from the hot spot may not vary. During use, as the electrical element heats and cools, the optical path length differences may change, and the resultant output light may increase or decrease in brightness (with such increases or decreases varying in degree for different light wavelengths) as the temperature of the electrical element rises or falls. As another example, the sensitivity to interference may place relatively tight manufacturing tolerances on the output grating 612, so that a manufacturer of the full display device may see part-to-part variations in brightness.

In some cases, interference effects and/or other design factors can cause light of different wavelengths to diffract out of different regions of the output grating 612 at varying levels of brightness, resulting not only in brightness non-uniformity but also color non-uniformity. In addition to interference effects that may affect different wavelengths of light differently at different regions of the area of the output grating 612, another factor that can cause color non-uniformity is the different outcoupling efficiency of regions of the output grating 612 with respect to different frequencies of light and/or different angles of incidence of the light. For example, an output grating 612 may be designed such that its grating lines or other diffractive optical elements are spaced apart from each other at a fixed period, and/or having a particular shape, such that different wavelengths of light interact with the output grating 612 more or less often than each other, and/or are more or less likely to outcouple from the waveguide 602 during a given interaction with the output grating 612. In some examples, light having a relatively short wavelength (e.g., blue light) may experience more interactions with the output grating 612 per unit of optical path length traveled within the waveguide relative to light having a longer wavelength (e.g., red light). This may result in more of the blue light exiting the output grating 612 at high levels of brightness close to an input region of the output grating 612 (e.g., close to the input grating 610) becoming depleted by the distal end of the output grating 412, and red light exiting the output grating 612 more gradually as the light propagates through the waveguide 602 away from the input region.

Even in displays using multiple color-specific waveguides, each waveguide having a distinct output grating 612 optimized for the specific color of light propagating through the waveguide, color non-uniformity can result from factors such as the interference effects described above, part-to-part variations due to manufacturing variance, distortions caused by heat or mechanical deformation, undesired partial in-coupling of light of the wrong wavelength into a waveguide intended for a different wavelength, and so on.

Examples described herein attempt to correct for color non-uniformity in displays, such as see-through XR displays using waveguides.

Figure 8:
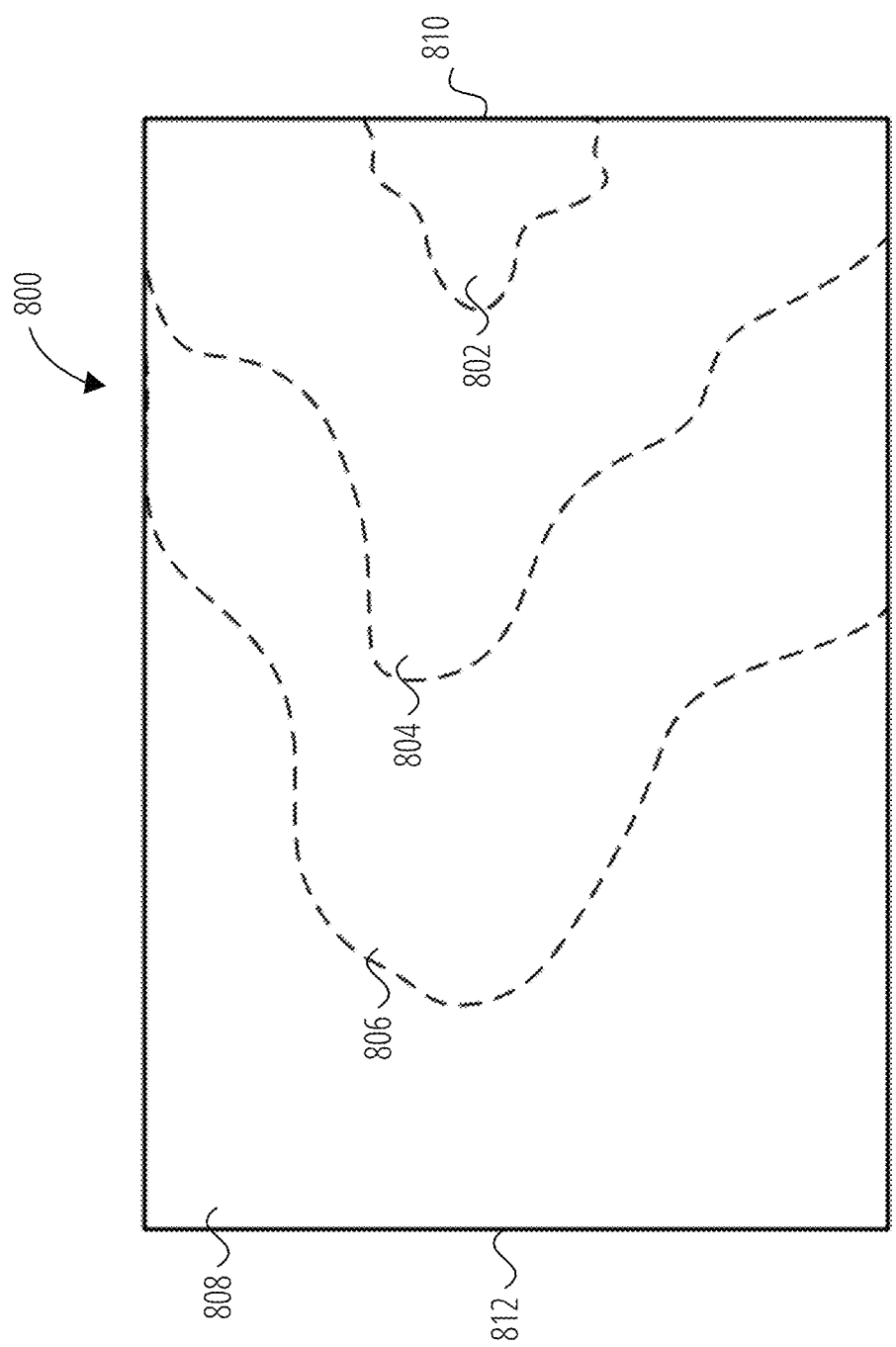
FIG. 8 illustrates an example distribution of red light emitted across a virtual image surface of an image presented by a waveguide of a display, in accordance with some examples.

FIG. 8 illustrates an example distribution of red light propagating toward a user's eye from virtual image surface locations across the virtual image surface. The non-uniformity of red light shown in FIG. 8 results from non-uniformity in the propagation of red light diffracting at different angles from different locations (e.g., different exit pupils) across a surface of a waveguide of a display. The red light distribution 800 shows bright red light region 802 in which the amount of red light emitted is above a first brightness threshold, a moderate red light region 804 in which the amount of red light emitted is between the first brightness threshold and a second brightness threshold, a dim red light region 806 in which the amount of red light emitted is between the second brightness threshold and a third brightness threshold, and a very dim red light region 808 in which the amount of red light emitted is below the third brightness threshold. The waveguide, and the virtual image surface, have an input side 810 close to an input grating or other light input or light source, and a distal side 812 distant from the light input: for example, in the illustration of FIG. 6, the input side 810 of the waveguide 602 would be along the top edge of the waveguide 602, and the distal side 812 would be along the bottom edge of the waveguide 602.

In FIG. 8, the amount of red light propagating from the virtual image surface is higher near the input side 810 than the distal side 812. However, the pattern of diminishing red light is idiosyncratic to the behavior of light of the red light wavelength (e.g., the third wavelength, such as a wavelength in the red light range of 620 to 750 nm). When combined with other patterns of diminishment of light exiting the waveguide idiosyncratic to other light wavelengths, as shown in the examples of FIG. 9 and FIG. 10, color non-uniformity can result, as shown in FIG. 11.

Figure 9:
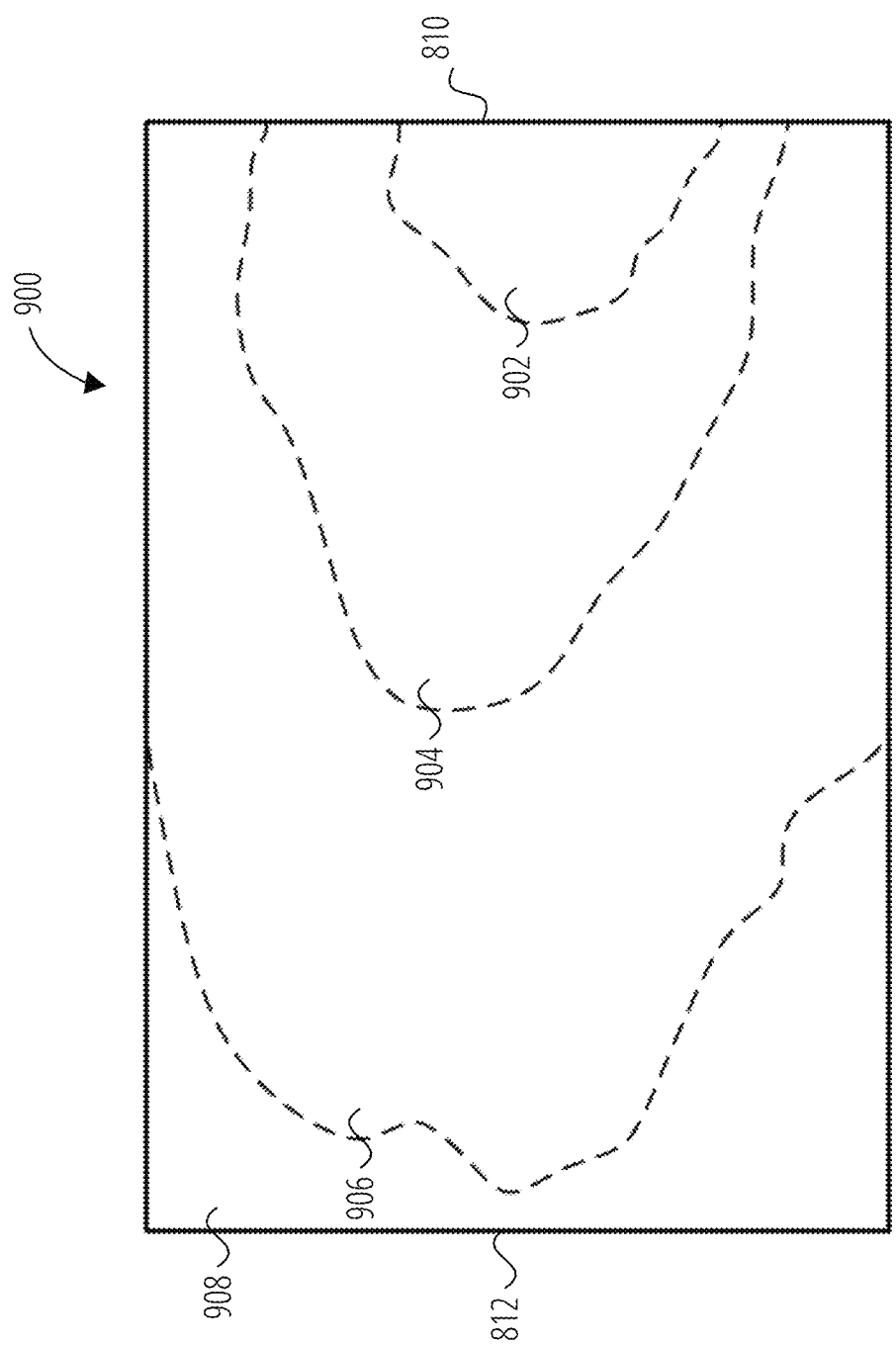
FIG. 9 illustrates an example distribution of green light emitted across a virtual image surface of an image presented by a waveguide of a display, in accordance with some examples.

FIG. 9 illustrates an example distribution of green light propagating toward a user's eye from virtual image surface locations across the virtual image surface. The non-uniformity of green light shown in FIG. 9 results from non-uniformity in the propagation of green light diffracting at different angles from different locations (e.g., different exit pupils) across a surface of a waveguide of a display. The green light distribution 900 shows bright green light region 902 in which the amount of green light emitted is above a first brightness threshold, a moderate green light region 904 in which the amount of green light emitted is between the first brightness threshold and a second brightness threshold, a dim green light region 906 in which the amount of green light emitted is between the second brightness threshold and a third brightness threshold, and a very dim green light region 908 in which the amount of green light emitted is below the third brightness threshold. The waveguide, and the virtual image surface, have an input side 810 and a distal side 812, as in FIG. 8.

In FIG. 9, the amount of green light propagating from the virtual image surface is higher near the input side 810 than the distal side 812. However, the pattern of diminishing green light is idiosyncratic to the behavior of light of the green light wavelength (e.g., the second wavelength, such as a wavelength in the green light range of 500 to 570 nm).

Figure 10:
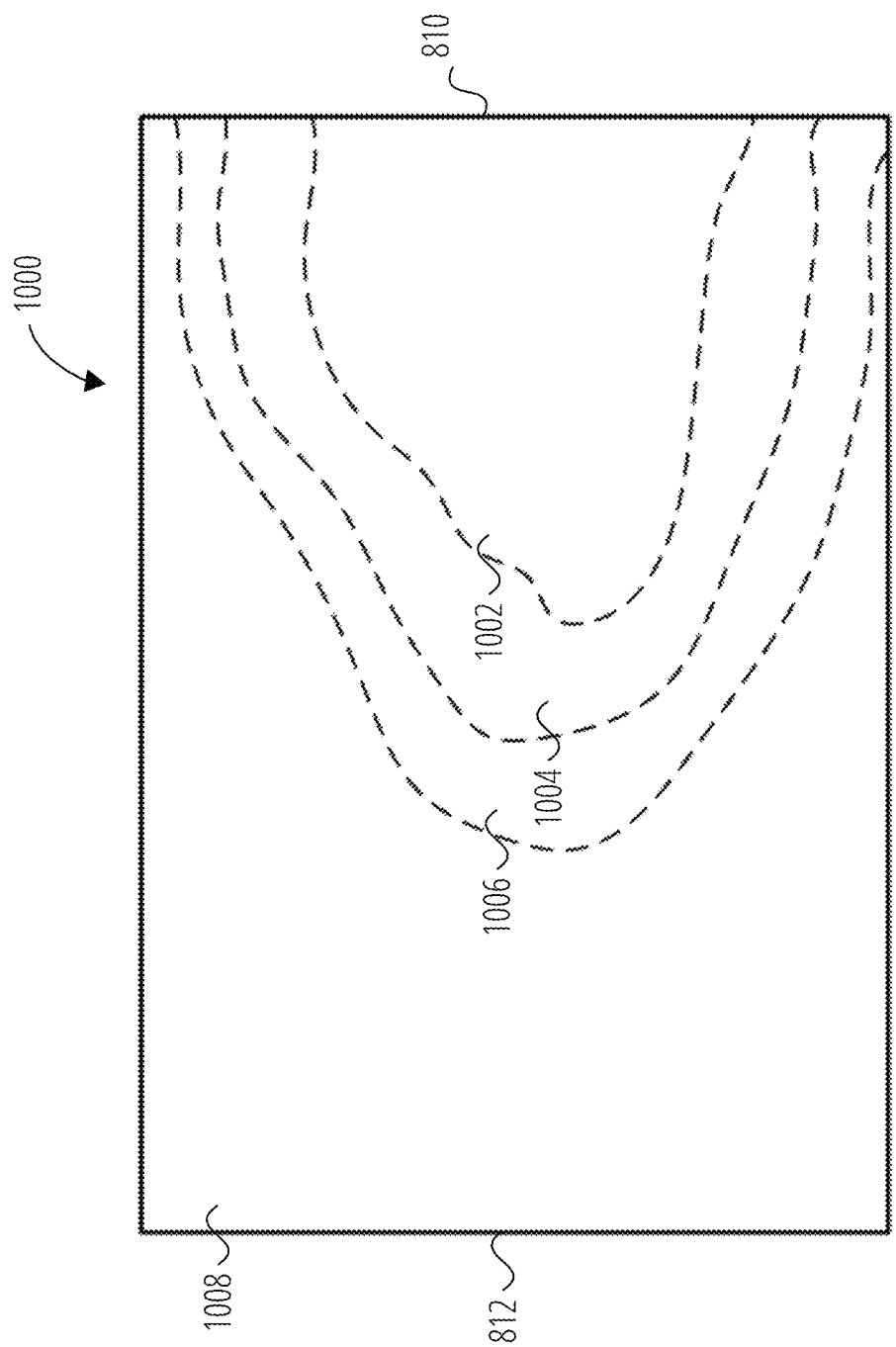
FIG. 10 illustrates an example distribution of blue light emitted across a virtual image surface of an image presented by a waveguide of a display, in accordance with some examples.
Figure 11:
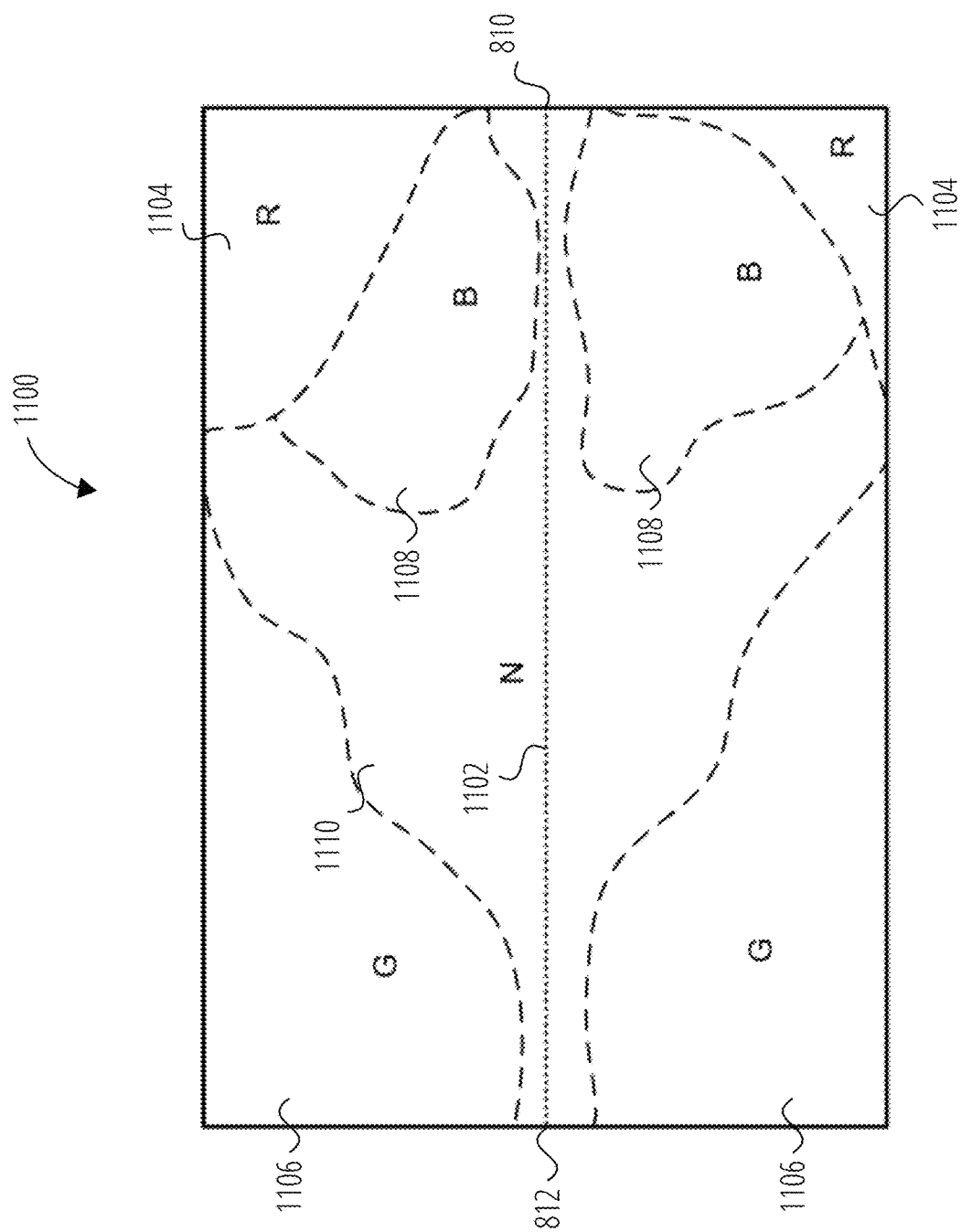
FIG. 11 illustrates an example distribution of predominant colors of light emitted across a virtual image surface of an image presented by a waveguide of a display, in accordance with some examples.

FIG. 10 illustrates an example distribution of blue light propagating toward a user's eye from virtual image surface locations across the virtual image surface. The non-uniformity of blue light shown in FIG. 10 results from non-uniformity in the propagation of blue light diffracting at different angles from different locations (e.g., different exit pupils) across a surface of a waveguide of a display. The blue light distribution 1000 shows bright blue light region 1002 in which the amount of blue light emitted is above a first brightness threshold, a moderate blue light region 1004 in which the amount of blue light emitted is between the first brightness threshold and a second brightness threshold, a dim blue light region 1006 in which the amount of blue light emitted is between the second brightness threshold and a third brightness threshold, and a very dim blue light region 1008 in which the amount of blue light emitted is below the third brightness threshold. The waveguide, and the virtual image surface, have an input side 810 and a distal side 812, as in FIG. 8.

In FIG. 10, the amount of blue light propagating from the virtual image surface is higher near the input side 810 than the distal side 812. However, the pattern of diminishing blue light is idiosyncratic to the behavior of light of the blue light wavelength (e.g., the first wavelength, such as a wavelength in the blue light range of 450 to 495 nm).

FIG. 11 illustrates an example non-uniform RGB light distribution 1100 of predominant colors of light emitted across a virtual image surface. FIG. 11 can be considered to be the result of the example idiosyncratic red light distribution 800, green light distribution 900, and blue light distribution 1000 shown in FIG. 8 through FIG. 10.

The uneven distributions of red, green, and blue light across the virtual image surface locations result in regions of the virtual image surface having a white point of the image distorted or shifted within a color space. In the illustrated example, the non-uniform RGB light distribution 1100 includes a relatively neutral region 1110 with a white point close to the intended white point of the imaging system. The neutral region 1110 is concentrated near a centerline 1102 running from the input side 810 to the distal side 812: in some cases, a waveguide may introduce less distortion to light travelling a relatively straight path from the input side 810 to the distal side 812, but relatively more distortion to light diffracted to the sides of the centerline 1102, for the reasons described above with reference to FIG. 7.

To the sides of the centerline 1102, the non-uniform RGB light distribution 1100 includes predominantly red regions 1104 in the corners of the input side 810, predominantly blue regions 1108 concentrated closer to the centerline 1102 near the input side 810, and predominantly green regions 1106 close to the distal side 812 away from the centerline 1102. In each of these regions, the white point of the image as presented from the virtual image surface will deviate from the white point intended by the imaging system, shifted toward the respective dominant color of the region, unless color correction is performed to counteract or mitigate this color non-uniformity.

It will be appreciated that the regions shown in FIG. 11 are simplified examples. In some examples, the dominant color of the light exiting a given virtual image surface location will vary continuously across the virtual image surface, and the color mix of the emitted light may deviate from a desired white point in more than one dimension (e.g., in three dimensions of a color space, such as hue, value, and brightness).

To counteract or mitigate the color non-uniformity exhibited by the non-uniform RGB light distribution 1100, various color correction techniques may be used, as described below with reference to FIG. 12 through FIG. 15.

Figure 12:
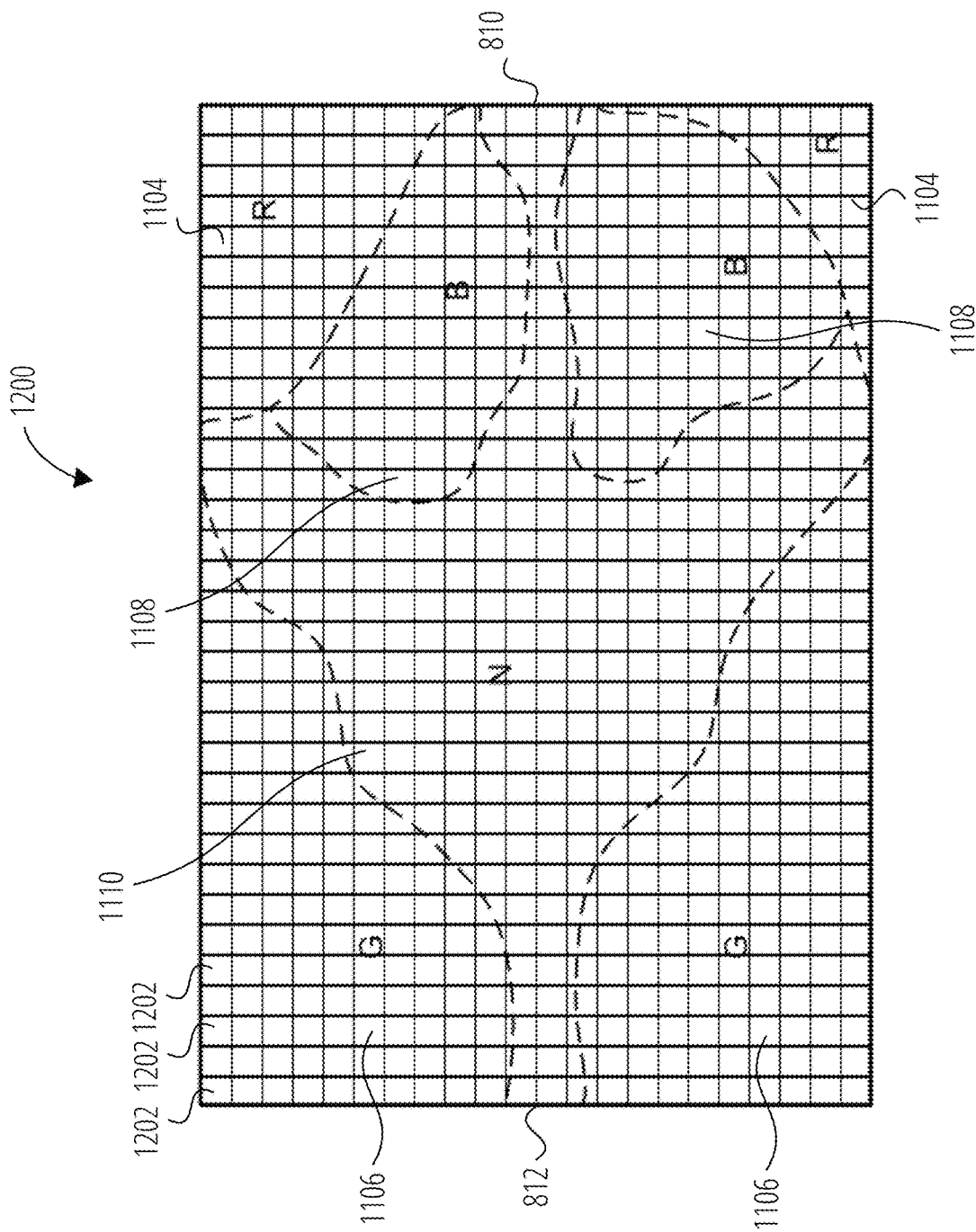
FIG. 12 illustrates a pixel shading map overlaid on the example distribution of predominant colors of FIG. 11, in accordance with some examples.

FIG. 12 illustrates a pixel shading map 1200 overlaid on the example non-uniform RGB light distribution 1100 of FIG. 11. The pixel shading map 1200 includes an array of pixel regions 1202, each pixel region 1202 having a corresponding pixel shading value indicating a color shift to be applied to the pixel region 1202 to at least in part counteract or mitigate the color non-uniformity of the non-uniform RGB light distribution 1100.

In some examples, the pixel shading map 1200 can be implemented as a two-dimensional array of data representative of the pixel shading values of the pixel regions 1202. Each pixel region 1202 can correspond to a single pixel, or a region of multiple pixels (e.g., a grid of 10×10 pixels) of the image former (e.g., image former 302 of image former 408). In some examples, the pixel shading map can be implemented and stored as a look up table having pixel shading values for the plurality of pixels of the image former (e.g., as defined by the pixel shading values of the pixel regions 1202). In use, the pixel shading map 1200 can be applied to the image former, or to image data provided to the image former, to shade the pixels of the image formed by the image former according to the pixel shading values of the pixel regions 1202. In some examples, the pixel shading map 1200 may be combined with other color correction settings to more effectively counteract or mitigate the color non-uniformity of non-uniform RGB light distribution 1100. An example color correction system for performing color correction using such color correction settings is described below with reference to FIG. 13. A method for performing the color correction is described with reference to FIG. 14. And a method for generating the color correction settings, including the pixel shading map 1200, is described with reference to FIG. 15.

Figure 13:
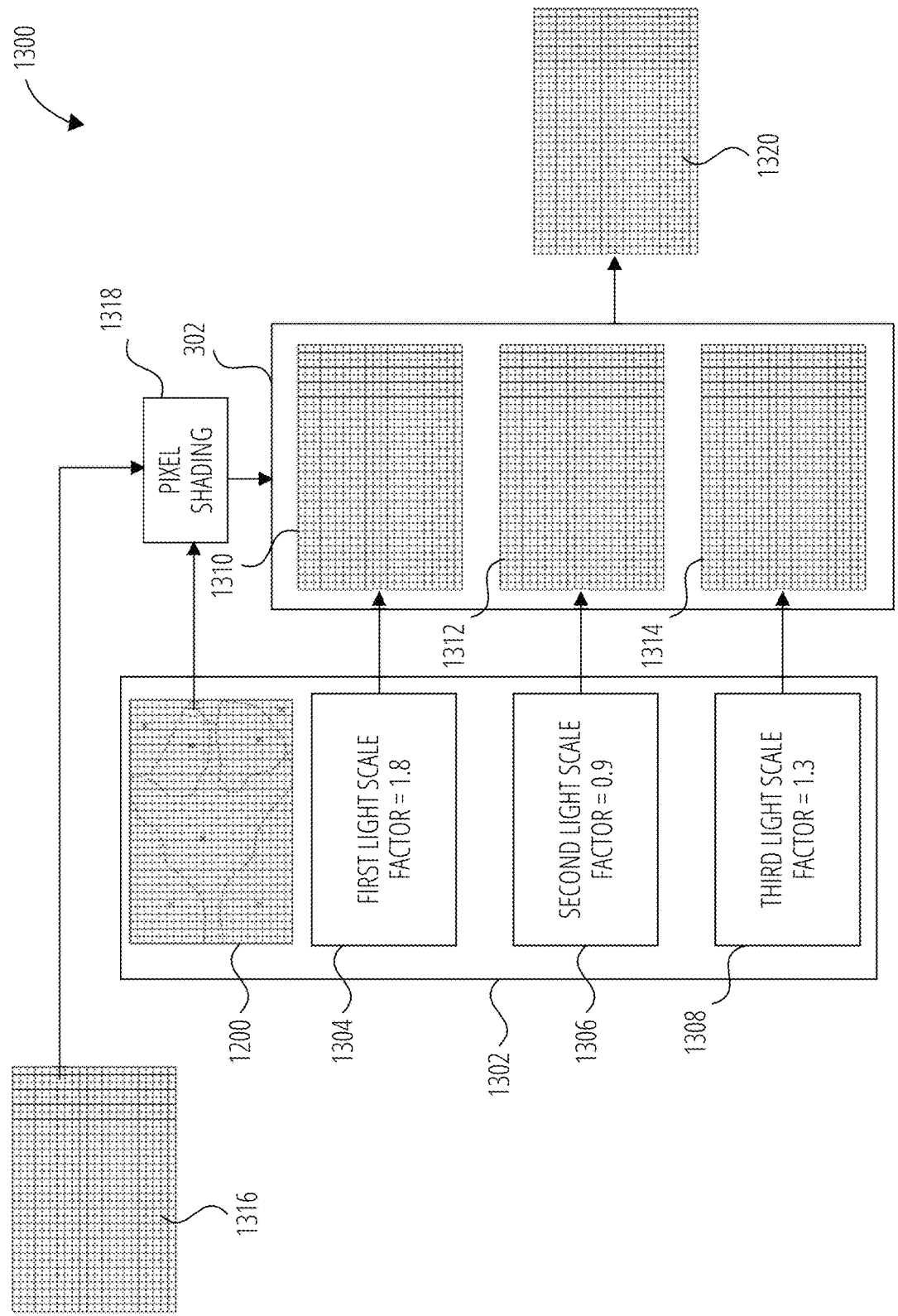
FIG. 13 illustrates a block diagram of a color correction system, in accordance with some examples.

FIG. 13 shows a block diagram of an example color correction system 1300. In some examples, the color correction system 1300 can be implemented as a subsystem of a computing system, such as computer 120, machine 1600, or machine 1704, or a software subsystem of software architecture 1702.

The color correction system 1300 includes a set of color correction settings 1302 stored in a memory. The color correction settings 1302 include the pixel shading map 1200 of FIG. 12, as well as scale factors for each color of light propagated by the image former 302: in the illustrated example, the scale factors are shown as a first light scale factor 1304 (stored as a scalar value of 1.8), a second light scale factor 1306 (stored as a scalar value of 0.9), and a third light scale factor 1308 (stored as a scalar value of 1.3).

Image data 1316 is received by a pixel shading subsystem 1318. The image data 1316 may be any suitable image data format, such as a two-dimensional array of three-channel (e.g., RGB) pixel value data. The pixel shading subsystem 1318 applies the pixel shading map 1200 to the image data 1316 to shade the pixel regions 1202 of the image data 1316 before sending the shaded image data to the image former (e.g., image former 302 or image former 408). The color elements of the pixels of the image former are shown as three distinct arrays in this example: a first color element array 1310, a second color element array 1312, and a third color element array 1314. While forming the image based on the shaded image data from the pixel shading subsystem 1318, the electrical stimuli (e.g., a current or voltage value) applied to the individual color elements of the first color element array 1310 are all scaled (e.g., multiplied) by the first light scale factor 1304, the electrical stimuli applied to the individual color elements of the second color element array 1312 are all scaled by the second light scale factor 1306, and the electrical stimuli applied to the individual color elements of the third color element array 1314 are all scaled by the third light scale factor 1308. In examples having a single light source of each color, as described above (e.g., a color-sequential LCOS display), the electrical stimuli may be scaled and applied to the three light sources to modulate the amount of light of each color emitted by the three light sources during its respective color sub-frame. The image (as shaded by the pixel shading map 1200) is formed using the individual pixel elements of the LCOS panel, by modulating the reflectivity of each pixel of the panel during each of the three color sub-frames. Thus, it will be appreciated that the shaded image data output by the pixel shading subsystem 1318 can be a three-channel image, each channel being used to modulate the reflectivity of the LCOS panel pixels during a corresponding color sub-frame.

The image former forms the image, using the shaded image data from the pixel shading subsystem 1318 to drive the first color element array 1310, second color element array 1312, and third color element array 1314 using their respectively scaled electrical stimuli. The image thereby formed by the image former is a color corrected image 1320. The light forming the color corrected image 1320 is then propagated to the display surface, where it is presented to the user's eye as an image presented at the virtual image surface that has reduced color non-uniformity relative to the image that would have been formed by the image former by using the image data 1316 to drive the color element arrays without applying the pixel shading map 1200, first light scale factor 1304, second light scale factor 1306, and third light scale factor 1308.

The scale factors used to scale the electrical stimuli can be configured to achieve a known change in light emission or propagation by the color elements. Thus, for example, if the relationship between a current stimulus to a color element (e.g., a blue LED) and the light emission of that element is known to follow a known mathematical relationship (e.g., a linear relationship), then the scale factor can be configured to effect a known mathematical change to the amount of light emitted by a given color element. The nature of the relationship between scaling the electrical stimulus and an increase or decrease in light propagation by a given color element can be taken into account in configuring the value of the scale factor, as described in further detail below with reference to the color correction setting generation method of FIG. 15.

Figure 14:
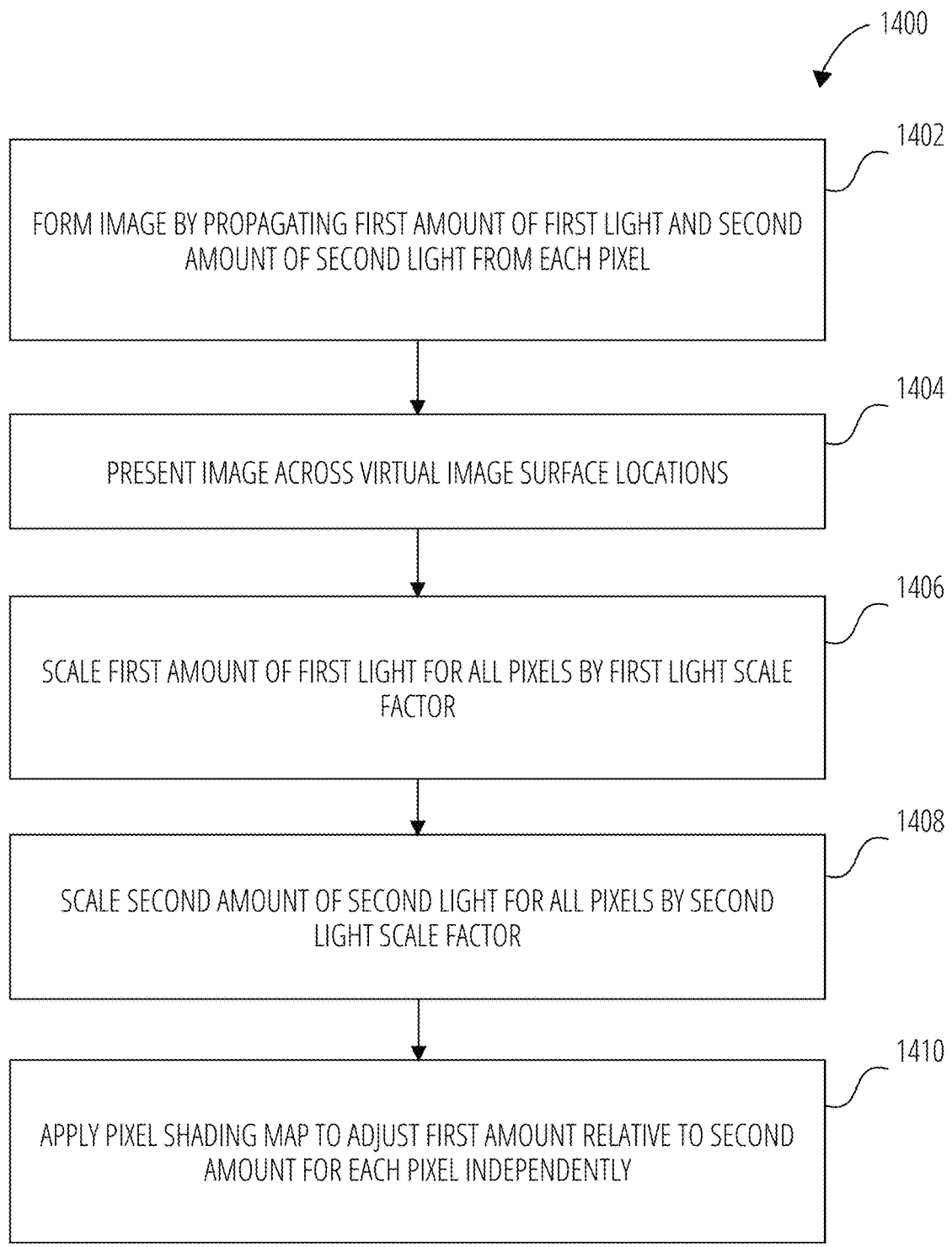
FIG. 14 illustrates a method for color correction of a display system, in accordance with some examples.

FIG. 14 illustrates a method 1400 for color correction of a display system.

The method 1400 is described as being implemented by the display system 100 using the color correction system 1300. However, it will be appreciated that the operations of method 1400 can be implemented or performed, in some cases, by other suitable systems or devices.

Although the example method 1400 depicts a particular sequence of operations, the sequence may be altered without departing from the scope of the present disclosure. For example, some of the operations depicted may be performed in parallel or in a different sequence that does not materially affect the function of the method 1400. In other examples, different components of an example device or system that implements the method 1400 may perform functions at substantially the same time or in a specific sequence.

According to some examples, the method 1400 includes forming an image by propagating, from each pixel of a display of the display system (e.g., each pixel of the image former), a respective first amount of first light and a respective second amount of second light at operation 1402. As described above, the first light has a first wavelength and the second light has a second wavelength. The first amount of the first light is propagated by the first color element (e.g., first color element 306a) based on a first electrical stimulus applied to the first color element, and the second amount of the second light is propagated by the second color element (e.g., second color element 308a) based on a second electrical stimulus applied to the second color element. In some examples, the pixels also include respective third color elements (e.g., third color element 310a), which are similarly configured to propagate a third amount of third light having a third wavelength, the third amount being based on a third electrical stimulus applied to the third color element.

As described above, in some examples the image former can include at least one array of LEDs configured to emit the first light and second light of each pixel. In some examples, the image former can include at least one LCOS panel configured to propagate the first light and second light of each pixel through reflection. Other image former types can be used, such as those described above.

According to some examples, the method 1400 includes presenting the image across a plurality of virtual image surface locations at operation 1404. The light propagated from each pupil of the image former can be propagated (e.g., via a projector and waveguide) to the display surface for presentation to a user's eye (e.g., presentation at various viewing angles to present the image at the virtual image surface). In some examples, the display surface can include a surface of a waveguide, the waveguide being configured to present the image across the plurality of display surface locations. As described above, in the context of waveguide-based displays, the pixels of the image may be presented at the corresponding virtual image surface locations by propagating light from the waveguide surface at angles intersecting a real or hypothetical pupil of an eye.

According to some examples, the method 1400 includes scaling the first amount of the first light (e.g., blue light) for all pixels (e.g., pixel 304a through pixel 304d) of the image former by a first light scale factor 1304 at operation 1406. In some examples, the first light scale factor 1304 can be stored as a scalar value in a memory as part of the color correction settings 1302.

According to some examples, the method 1400 includes scaling the second amount of the second light (e.g., green light) for all pixels by a second light scale factor 1306 at operation 1408. In some examples, the second light scale factor 1306 can be stored as a scalar value in a memory as part of the color correction settings 1302.

In some examples (not shown), propagation of one or more additional colors of light may also be scaled by scaling further electrical stimuli to other arrays of color elements, such as third color element array 1314, by additional scale factors (such as third light scale factor 1308).

According to some examples, the method 1400 includes applying a pixel shading map 1200 to adjust the first amount of the first light relative to second amount of the second light for each pixel independently at operation 1410. In some examples, the pixel shading map 1200 also adjusts a third amount of the third light relative to the first amount of the first light and the second amount of the second light. Thus, as described above, the pixel shading map 1200 may operate to shift the color mix and/or white point of the two or more colors of light within a color space, such as a two- or three-dimensional color space.

Thus, whereas the scale factors (e.g., first light scale factor 1304, second light scale factor 1306, and third light scale factor 1308) scale the amount of light of a given wavelength propagated by the entire image former, the pixel shading map 1200 is used to spatially modulate the amounts of the different wavelengths of light at different pixel locations, and thereby different display surface locations and/or viewing angles, and thereby different virtual image surface locations.

It will be appreciated that, whereas the operations of method 1400 are presented in order from operation 1402 to operation 1410, in some examples the electrical stimulus scaling and pixel shading map application operations are performed before and/or during the light propagation operations. In some examples, the operations of method 1400 are performed continuously and concurrently while presenting an image or a sequence of images from the display.

Figure 15:
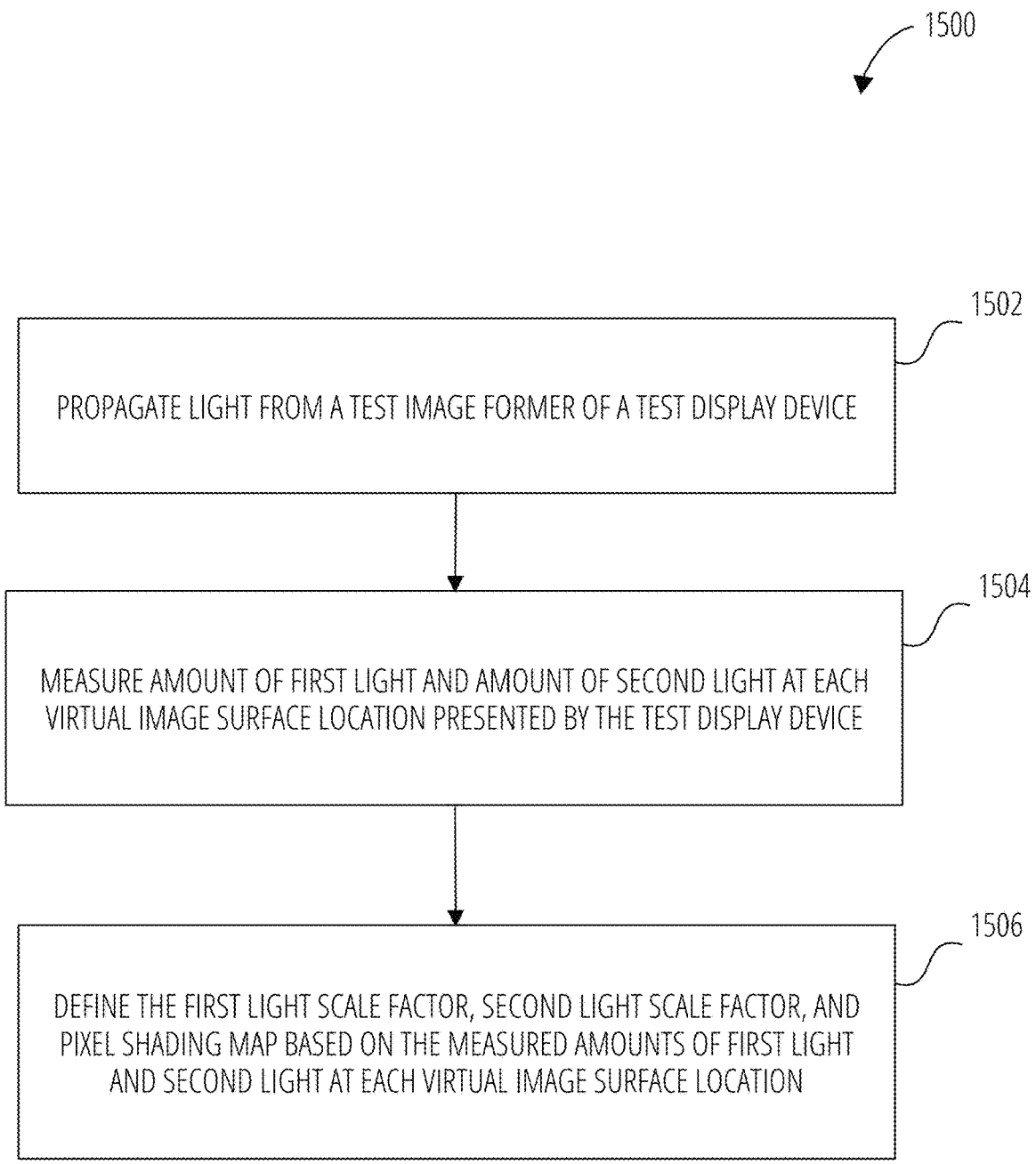
FIG. 15 illustrates a method for generating color correction settings for a display system, in accordance with some examples.

FIG. 15 illustrates a method 1500 for generating color correction settings 1302 for a display system 100. In some examples, method 1500 is performed at a factory or a similar setting where devices are calibrated. Method 1500 can be performed once to generate color correction settings 1302 for a given model of display system 100, and these color correction settings 1302 can then be installed or provisioned to an entire manufactured line of such display systems 100. After provisioning, the display systems 100 can use the color correction settings 1302 as part of their color correction systems 1300 to perform method 1400.

Although the example method 1500 depicts a particular sequence of operations, the sequence may be altered without departing from the scope of the present disclosure. For example, some of the operations depicted may be performed in parallel or in a different sequence that does not materially affect the function of the method 1500. In other examples, different components of an example device or system that implements the method 1500 may perform functions at substantially the same time or in a specific sequence.

Method 1500 can be performed using a device or system that is similar or identical to the display system 100 in material respects, such as a test device that is manufactured to the same technical specifications as the display system 100. In some examples, the method 1500 is performed using the actual display system 100 that will be deployed for color-corrected operation (e.g., to perform method 1400). Regardless of whether the device used to perform method 1500 is the same device as or a different device from the device used to perform method 1400, the device used to perform method 1500 may be referred to herein as a "test device" or a "test display system" having components analogous to those of the device used to perform method 1400 but optionally distinguished by the word "test" for clarity (e.g., a test display, a test display surface, a test image former, and so on).

According to some examples, the method 1500 includes propagating light from a test image former of a test display device at operation 1502. The test image former may be operated as the image former of the display system 100, but without applying any of the color correction techniques of the color correction system 1300. In some examples, the image formed by the test image former is a visual test pattern providing a uniform, standardized array of color values spanning a wide range of color mixes at different pixels locations in the image. In some examples, the test image former forms three images used for testing, each being a flat color image (e.g., a flat red image, a flat green image, and a flat blue image)—these three images may be referred to herein as tristimulus images.

According to some examples, the method 1500 includes measuring an amount of the first light and an amount of the second light (as well as, in some examples, an amount of the third light and/or one or more additional wavelengths of light) presented at each of multiple virtual image surface locations by the test display device at operation 1504. The light may be measured by capturing one or more images of the display surface using a camera (or a pair of cameras for a binocular display device 100). In some examples, the camera lens entrance pupil is positioned at a position corresponding to a center of eye rotation (COER) for a hypothetical user's eye viewing the display surface. In some examples, the camera lens entrance pupil is positioned at a design eye position (DEP) corresponding to an idealized eye position based on the design of the display system 100. In some examples, the amount of light measured for each test display surface location is measured with respect to a specific viewing angle, or across a range of viewing angles, such as across the entire 180 degree arc of the eye side of the test display surface. In some examples, the amount of light is measured for each of multiple exit pupils of the test display surface, such as multiple exit pupils of a waveguide-based test display. In some examples, the light measured at multiple exit pupils is mapped to a viewing angle rather than, or in addition to, a display surface location. The light measurements taken across multiple emission angles and/or multiple viewing angles of the entire display and/or multiple exit pupils of the display can be combined in various ways to generate a measure of the mix of light at multiple locations and/or angles corresponding to multiple pixel locations within the image. In some examples, the light measurements of a first exit pupil are combined with light measurements from a second exit pupil by combining the measurements of a first viewing angle of the first exit pupil with those of a second viewing angle of the second exit pupil, wherein the two viewing angles both correspond to the same pixel location within the image. Other mappings can be used for combining the measurements of light depending on the display technology being used and the nature of the color non-uniformities arising therefrom. In some examples, the size and position of the camera lens entrance pupil is such that light is received from multiple exit pupils (e.g., 4 or 5 exit pupils) of the waveguide surface. Each angle of light exiting the exit pupils corresponds to an image pixel location, and thus to a virtual image location. Thus, the light sensor of the camera may capture light at a given viewing angle from multiple exit pupils and aggregate this light to form a brightness measure for the given viewing angle, and thus a corresponding virtual image location.

Combining the measurements of light from a range of viewing angles, exit pupils, and/or emission angles, in order to arrive at an aggregate measure of light corresponding to a given pixel location within the image, can be accomplished by various means. In some examples, the light sensor automatically aggregates the light from multiple exit pupils and generates a brightness measure for each color of light at each viewing angle. In some examples, the amounts of light from multiple such measurements may be combined by an averaging function or a weighted averaging function. For example, light measured across a range of emission angles (e.g., across 180 degrees) may weight the measures taken closer to the display surface normal angle more heavily than measures taken at more oblique angles, such that the color mix of the light emitted at a 90 degree angle to the display surface is given more weight than the light emitted at a 10 degree angle from the display surface: this can serve to prioritize the visual experience of a viewer viewing the display head-on over a viewer viewing the display at a steep angle.

According to some examples, the method 1500 includes defining color correction settings 1302 (e.g., the first light scale factor 1304, second light scale factor 1306, third light scale factor 1308, and pixel shading map 1200) based on the measured amounts of first light and second light (and optionally third light and/or other light) at each virtual image surface location at operation 1506. The color correction settings 1302 are intended to increase uniformity of the amounts of the first light and second light (and optionally third light and/or other light) presented across the plurality of virtual image surface locations (or virtual image surface locations of a display system 100 performing method 1400). Specifically, the first light scale factor 1304 is configured to scale the first electrical stimulus of each pixel of the image former to modulate an amount of the first light propagated by the pixel, the second light scale factor 1306 is configured to scale the second electrical stimulus of each pixel of the image former to modulate an amount of the second light propagated by the pixel, the third light scale factor 1308 is configured to scale the third electrical stimulus of each pixel of the image former to modulate an amount of the third light propagated by the pixel, and the pixel shading map 1200 is configured to independently adjust, for each pixel of the image former, the relative amounts of the first light, second light, and third light.

In some examples, the color correction settings 1302 can be generated or determined based on a color non-uniformity measure. Specifically, the color correction settings 1302 can be generated to have values that reduce the color non-uniformity measure. In some examples, the color non-uniformity measure is based at least in part on one or more of three different factors related to color non-uniformity: a monocular non-uniformity measure, a smoothness measure, and/or a binocular rivalry measure. In some examples, the three factors are combined to define the color non-uniformity measure.

The monocular non-uniformity measure may be representative of a difference, across the plurality of virtual image surface locations, between the measured light (e.g., the light measured at operation 1502, which may yield a non-uniform distribution of measured light such as non-uniform RGB light distribution 1100) and an ideal target distribution of light color. The measured light may be a measure of the amounts of the first light, second light, and third light at each virtual image surface location (and/or viewing angles, emission angles, and/or exit pupils). The ideal target distribution may be a white-balanced target distribution of first light, second light, and third light.

The monocular non-uniformity measure can be considered in some examples to be a difference between an output tristimulus estimate (indicating the measured amounts of the three colors of light) and an ideal white balanced target (as transformed in a CIELUV or CIELAB color space). Mathematically, in some examples, the monocular non-uniformity measure can be denoted as $$\|\tilde{X}(r, k) - X_{target}\|_2^2$$

in which $\tilde{X}(r,k)$ is the measured distribution of the amount of light X over virtual image surface coordinates (r,k), and $X_{target}$ is the ideal white-balanced target amount of light of each color at each virtual image surface location.

The smoothness measure may be representative of a total variation in the measured amounts of the first light, second light, and third light across the plurality of virtual image surface locations. Mathematically, in some examples, the smoothness measure can be denoted as $TV(r)$ where $TV(r)$ denotes a total variation over the virtual image surface coordinate r.

The binocular rivalry measure may be used for binocular displays having a left near-eye display and a right near-eye display. The binocular rivalry measure may be representative of a difference measured for each of the plurality of virtual image surface locations of the test left near eye display and corresponding virtual image surface locations of the test right near eye display: for example, one instance of the difference may be measured between the light amounts approaching the left eye from a given angle from one or more locations on the left near-eye display, and the amounts of light approaching the right eye from the same given angle from one or more corresponding locations on the right near-eye display. The measured difference can be a combination of the differences of the amounts of the two or more wavelengths of light. For example, the measured difference for a given view angle or virtual image surface location can be a difference in the amounts of the first light presented by the test left near eye display and the test right near eye display at the virtual image surface location, combined with a difference in the amounts of the second light presented by the test left near eye display and the test right near eye display at the virtual image surface location, and further combined with a difference in the amounts of the third light presented by the test left near eye display and the test right near eye display at the virtual image surface location. The combination of these three differences can be performed by any suitable combination technique, such as an averaging or summing technique. Mathematically, in some examples, the binocular rivalry measure can be denoted as $$\|\tilde{X}_{right}(r, k) - \tilde{X}_{left}(r, k)\|_2^2$$

where $\tilde{X}_{right}(r,k)$ is the measured amount of light X over virtual image surface coordinates (r,k) of the test right near-eye display and $\tilde{X}_{left}(r,k)$ is the measured amount of light X over virtual image surface coordinates (r,k) of the test left near-eye display.

In some examples, the three factors can be combined to form the color non-uniformity measure as a mathematical function by a combination technique such as summing or weighted summing. The three factors can be given individual weights, such as a smoothness constant A and a binocular rivalry constant t, such that the color non-uniformity measure can be denoted mathematically as $$\|\tilde{X}(r, k) - X_{target}\|_2^2 + \tau\|\tilde{X}_{right}(r, k) - \tilde{X}_{left}(r, k)\|_2^2 + \lambda TV(r).$$

The color correction settings 1302 can be generated to reduce, minimize, or optimize the color non-uniformity measure by defining spatial color correction estimates $\hat{r}, \hat{k}$ as $$\hat{r}, \hat{k} = \min_{r,k} \|\tilde{X}(r, k) - X_{target}\|_2^2 + \tau\|\tilde{X}_{right}(r, k) - \tilde{X}_{left}(r, k)\|_2^2 + \lambda TV(r)$$

$$\text{s.t. } r \in [B, 1],$$

where the image former 302 is constrained to encode colored light values on a bit scale less than or equal to some level B, with a maximum scalar RGB value of 1.0. The bit scale constraint is intended to limit the bit depth of the pixel shading map 1200 in order to preserve a reasonable range of pixel value encoding for the image.

This optimization problem can be solved by various means, such as by employing a merit function such as a 2-norm color distance measure using the CIEDE2000 standard or a CIELUV Du'v' technique, and using conjugate gradient descent to identify an optimal (or at least beneficial) solution. The solution to the minimization problem can be used to determine the color correction settings 1302: the modulation of the amount of each color of light emitted from each image location across the virtual image surface can be represented as a function of the first light scale factor 1304, second light scale factor 1306, third light scale factor 1308, and pixel shading map 1200, and these values can therefore be derived from the solution to the optimization problem.

In some examples, the measurements made in method 1500 may be made over a range of hypothetical eye pupil locations, to simulate a range of head sizes and/or interpupillary distances (IPDs). These measurements may be combined in any suitable way to allow optimization of the color correction settings 1302 to enhance color uniformity as experienced by users having a range of head sizes and/or IPDs. In some examples, making the measuring for a range of head sizes may involve deflecting the temple piece 122 and temple piece 124 outward to varying degrees, thereby simulating the placement of the display system 100 on heads of different sizes, such deflection potentially affecting the propagation of light from the projectors and through the waveguides of the display system 100.

In some examples, the data representing the light measurements can be preprocessed using various techniques before generating the color correction settings 1302 by solving the optimization problem defined above. Spatial filtering may be used to smooth out higher spatial frequencies in the light amount variation, thereby potentially reducing the sensitivity of method 1500 to eyebox mismatch. Captured RGB images of the light emitted across the virtual image surface (e.g., in the tristimulus images) may be down-sampled to match a lower resolution addressable correction grid (e.g., a pixel shading map 1200 having a smaller number of pixel regions 1202 than the number of pixels in the region). For example, a display system 100 capable of displaying 4 k resolution images (2000 by 2000 pixels) may use a substantially down-sampled correction grid for the pixel shading map 1200, such as a 40 by 40 grid of pixel regions 1202. The filtered, down-sampled tristimulus images (or pairs of images, e.g., if measuring left and right near-eye displays) may be represented as a grid in which each grid location is used as a localized starting point or matrix column used as input to a color inversion, e.g., using a SMPTE standard for color inversion. The target white point at each grid location is scaled such that the luminance is equal to an existing, uncorrected local luminance. This may minimize or reduce the required perturbations on RGB channels by the color correction settings 1302. In some examples, a vignetting function can be added to reduce brightness targets for non-correctable corners: for example, in some cases the amount of blue light emitted by the display surface is extremely dim near the corners of the display surface, and a vignetting function can be used to generate reduced brightness targets for locations far from the image center to be used as weights in a merit function.

For each down-sampled pixel region 1202, the color correction settings 1302 can be determined by solving the optimization problem (e.g., solving for the SMPTE inverse relationship) given the uncorrected RGB channel data from the tristimulus images and a target white point matrix. The output of solving the optimization problem provides a grid of values indicating how much each grid point needs to be scaled (in RGB space) to reach the target white point.

This scaling can then be decomposed into the first light scale factor 1304, second light scale factor 1306, third light scale factor 1308, and pixel shading map 1200. The output map can be divided into current scaling (e.g., by first light scale factor 1304, second light scale factor 1306, and third light scale factor 1308) and grayscale modulation (e.g., by the pixel shading map 1200). An optimal set of color correction settings 1302 can be generated by taking into account various constraints and trade-offs among factors such as color, power, and bit depth. In some examples, the scale factors used to scale the electrical stimuli may be constrained to maintain power usage under a maximum threshold. In some examples, the grayscale scaling by the pixel shading map 1200 may be constrained to a bit depth above threshold B (as described above) to minimize bit depth loss for color encoding by the image former. In some examples, the constrained optimization can be implemented as follows:

First, the scale factors 1304, 1306, and 1308 are computed as the mean or median of the power of the output SMPTE map on the RGB channels. This may reduce the amount of scaling that needs to be performed by the pixel shading map 1200 as grayscale modulation. This technique is similar to global color-balancing.

Second, grayscale scaling is computed to scale the grayscale values the rest of the way to the optimal solution. Any grayscale values outside of the constrained region [B, 1] may be clamped.

Third, the grayscale scaling for the final pixel map is inverse gamma transformed to generate the pixel shading map 1200.

It will be appreciated that the color correction settings 1302 generated by method 1500 can be used by a display system 100 to perform color correction method 1400 when presenting visual content to a user. In some examples, the display system 100 may not perform method 1400 in some circumstances, such as when outside or otherwise in a brightly-lit area, because the effects of color correction on projected virtual content may be washed out by the bright ambient light. In some examples, cameras or other light sensors may be used to detect high levels of ambient light, and the display system 100 may not perform the color correction operations of method 1400 when high ambient light levels are detected. This may save power and/or reduce heat generation by the display system 100, thereby conserving resources and/or improving user comfort.

Machine Architecture

Figure 16:
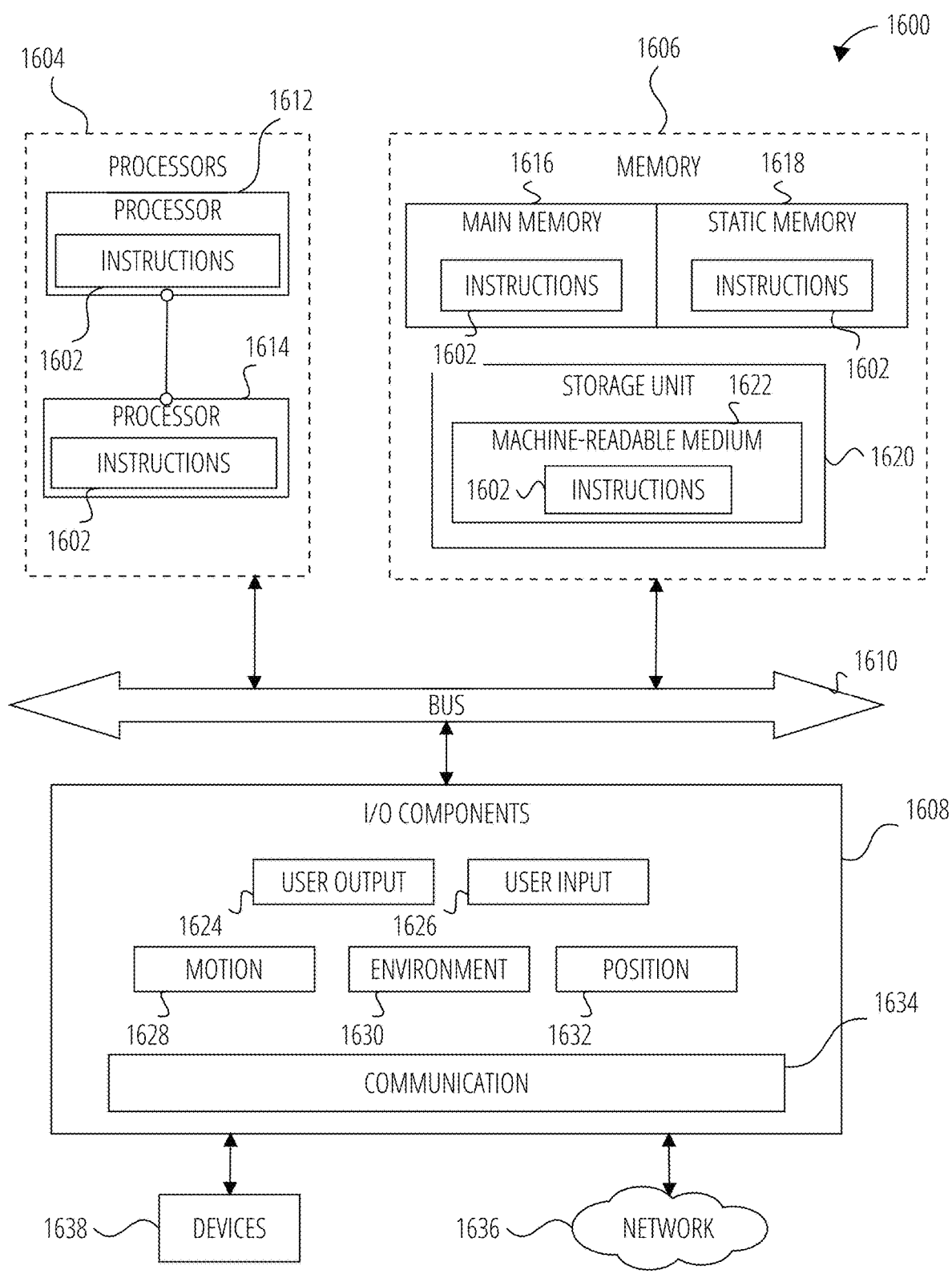
FIG. 16 is a diagrammatic representation of a machine in the form of a computer system within which a set of instructions may be executed to cause the machine to perform any one or more of the methodologies discussed herein, in accordance with some examples.

FIG. 16 is a diagrammatic representation of a machine 1600 within which instructions 1602 (e.g., software, a program, an application, an applet, an app, or other executable code) for causing the machine 1600 to perform any one or more of the methodologies discussed herein may be executed. For example, the instructions 1602 may cause the machine 1600 to execute any one or more of the methods 1400 and/or 1500 described herein and/or to implement the color correction system 1300. The instructions 1602 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch, a pair of augmented reality glasses), a smart home device (e.g., a smart appliance), other smart devices, a web appliance, a network router, a network switch, a network bridge, or any machine capable of executing the instructions 1602, sequentially or otherwise, that specify actions to be taken by the machine 1600. Further, while a single machine 1600 is illustrated, the term "machine" shall also be taken to include a collection of machines that individually or jointly execute the instructions 1602 to perform any one or more of the methodologies discussed herein. In some examples, the machine 1600 may comprise both client and server systems, with certain operations of a particular method or algorithm being performed on the server-side and with certain operations of the particular method or algorithm being performed on the client-side.

The machine 1600 may include processors 1604, memory 1606, and input/output I/O components 1608, which may be configured to communicate with each other via a bus 1610. In an example, the processors 1604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1612 and a processor 1614 that execute the instructions 1602. The term "processor" is intended to include multi-core processors that may comprise two or more independent processors (sometimes referred to as "cores") that may execute instructions contemporaneously. Although FIG. 16 shows multiple processors 1604, the machine 1600 may include a single processor with a single-core, a single processor with multiple cores (e.g., a multi-core processor), multiple processors with a single core, multiple processors with multiples cores, or any combination thereof.

The memory 1606 includes a main memory 1616, a static memory 1618, and a storage unit 1620, all accessible to the processors 1604 via the bus 1610. The main memory 1606, the static memory 1618, and the storage unit 1620 store the instructions 1602 embodying any one or more of the methodologies or functions described herein. The instructions 1602 may also reside, completely or partially, within the main memory 1616, within the static memory 1618, within machine-readable medium 1622 within the storage unit 1620, within at least one of the processors 1604 (e.g., within the processor's cache memory), or any suitable combination thereof, during execution thereof by the machine 1600.

The I/O components 1608 may include a wide variety of components to receive input, provide output, produce output, transmit information, exchange information, capture measurements, and so on. The specific I/O components 1608 that are included in a particular machine will depend on the type of machine. For example, portable machines such as mobile phones may include a touch input device or other such input mechanisms, while a headless server machine will likely not include such a touch input device. It will be appreciated that the I/O components 1608 may include many other components that are not shown in FIG. 16. In various examples, the I/O components 1608 may include user output components 1624 and user input components 1626. The user output components 1624 may include or communicate with visual components (e.g., one or more displays such as the left near-eye display and right near-eye display, a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1608 may include motion components 1628, environmental components 1630, or position components 1632, among a wide array of other components.

The motion components 1628 include acceleration sensor components (e.g., accelerometer), gravitation sensor components, rotation sensor components (e.g., gyroscope).

The environmental components 1630 include, for example, one or more externally-facing cameras (with still image/photograph and video capabilities) such as left camera 114 and right camera 116, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth sensors (such as one or more LIDAR arrays), or other components that may provide indications, measurements, or signals corresponding to a surrounding physical environment.

Further, the camera system of the machine 1600 may include dual rear cameras (e.g., a primary camera as well as a depth-sensing camera), or even triple, quad or penta rear camera configurations on the front and rear sides of the machine 1600. These multiple cameras systems may include a wide camera, an ultra-wide camera, a telephoto camera, a macro camera, and a depth sensor, for example.

The position components 1632 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1608 further include communication components 1634 operable to couple the machine 1600 to a network 1636 or devices 1638 via respective coupling or connections. For example, the communication components 1634 may include a network interface component or another suitable device to interface with the network 1636. In further examples, the communication components 1634 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1638 may be another machine or any of a wide variety of peripheral devices (e.g., a peripheral device coupled via a USB).

Moreover, the communication components 1634 may detect identifiers or include components operable to detect identifiers. For example, the communication components 1634 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1634, such as location via Internet Protocol (IP) geolocation, location via Wi-Fi® signal triangulation, location via detecting an NFC beacon signal that may indicate a particular location, and so forth.

The various memories (e.g., main memory 1616, static memory 1618, and memory of the processors 1604) and storage unit 1620 may store one or more sets of instructions and data structures (e.g., software) embodying or used by any one or more of the methodologies or functions described herein. These instructions (e.g., the instructions 1602), when executed by processors 1604, cause various operations to implement the disclosed examples, including method 1400, method 1500, and/or color correction system 1300.

The instructions 1602 may be transmitted or received over the network 1636, using a transmission medium, via a network interface device (e.g., a network interface component included in the communication components 1634) and using any one of several well-known transfer protocols (e.g., hypertext transfer protocol (HTTP)). Similarly, the instructions 1602 may be transmitted or received using a transmission medium via a coupling (e.g., a peer-to-peer coupling) to the devices 1638.

Software Architecture

Figure 17:
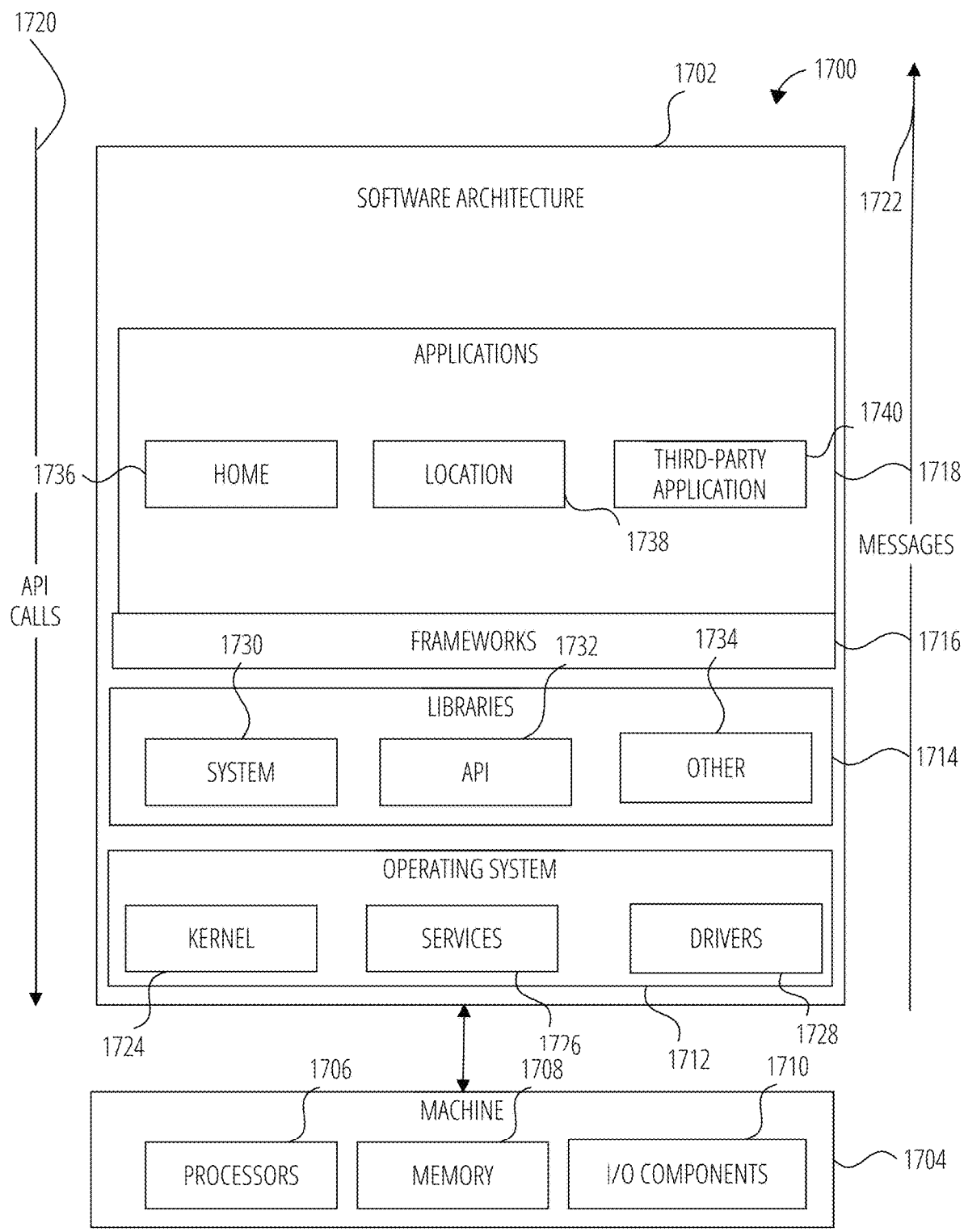
FIG. 17 is a block diagram showing a software architecture within which examples may be implemented, in accordance with some examples.

FIG. 17 is a block diagram 1700 illustrating a software architecture 1702, which can be installed on any one or more of the devices described herein. The software architecture 1702 is supported by hardware such as a machine 1704 that includes processors 1706, memory 1708, and I/O components 1710. In this example, the software architecture 1702 can be conceptualized as a stack of layers, where each layer provides a particular functionality. The software architecture 1702 includes layers such as an operating system 1712, libraries 1714, frameworks 1716, and applications 1718. The applications 1718 may include the color correction system 1300 as described herein. Operationally, the applications 1718 invoke API calls 1720 through the software stack and receive messages 1722 in response to the API calls 1720. The described examples and at least some of the functions of the subsystems and controllers thereof, including the color correction system 1300, may be implemented by components in one or more layers of the software architecture 1702.

The operating system 1712 manages hardware resources and provides common services. The operating system 1712 includes, for example, a kernel 1724, services 1726, and drivers 1728. The kernel 1724 acts as an abstraction layer between the hardware and the other software layers. For example, the kernel 1724 provides memory management, processor management (e.g., scheduling), component management, networking, and security settings, among other functionalities. The services 1726 can provide other common services for the other software layers. The drivers 1728 are responsible for controlling or interfacing with the underlying hardware. For instance, the drivers 1728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1714 provide a common low-level infrastructure used by the applications 1718. The libraries 1714 can include system libraries 1730 (e.g., C standard library) that provide functions such as memory allocation functions, string manipulation functions, mathematic functions, and the like. In addition, the libraries 1714 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1714 can also include a wide variety of other libraries 1734 to provide many other APIs to the applications 1718.

The frameworks 1716 provide a common high-level infrastructure that is used by the applications 1718. For example, the frameworks 1716 provide various graphical user interface (GUI) functions, high-level resource management, and high-level location services. The frameworks 1716 can provide a broad spectrum of other APIs that can be used by the applications 1718, some of which may be specific to a particular operating system or platform.

In an example, the applications 1718 may include a home application 1736, a location application 1738, and a broad assortment of other applications such as a third-party application 1740. The applications 1718 are programs that execute functions defined in the programs. Various programming languages can be employed to create one or more of the applications 1718, structured in a variety of manners, such as object-oriented programming languages (e.g., Objective-C, Java, or C++) or procedural programming languages (e.g., C or assembly language). In a specific example, the third-party application 1740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1740 can invoke the API calls 1720 provided by the operating system 1712 to facilitate functionalities described herein.

CONCLUSION

Examples described herein may address one or more technical problems associated with color non-uniformity of displays, such as XR displays, as described above. In some examples, the realism and/or accuracy of images presented by a display may be improved. Distraction may be reduced, and presentation of flat colors, skin tones, and/or images of clothing or decorations may be particularly improved. Matching of colors of virtual content with real-world visual content may be improved in XR. Chromatic binocular rivalry may be improved, reducing visual discomfort.

Some examples of the techniques described herein have been tested for efficacy and have shown a significant reduction in color variation. In one test, color variation was reduced by 75%, with a global color white point as defined across a 2-dimensional virtual image surface of CIExy= (0.28, 0.30). User testing also indicated that users generally noticed a substantial improvement in color uniformity. This improvement was achieved by the use of a pixel shading map 1200 in combination with scale factors averaging approximately a current scaling factor of 1.5 across three colors of LED emitters. Thus, the increase in electrical current (and associated power and cooling demands) required to achieve this result were modest.

Specific examples are now described.

Example 1 is a display system, comprising: at least one display comprising: an image former comprising a plurality of pixels configured to form an image, each pixel comprising: a first color element configured to propagate a first amount of a first light having a first wavelength, the first amount being based on a first electrical stimulus applied to the first color element; and a second color element configured to propagate a second amount of a second light having a second wavelength, the second amount being based on a second electrical stimulus applied to the second color element; a display surface configured to present the image across a plurality of virtual image surface locations; at least one processor; and a memory storing instructions that, when executed by the at least one processor, configure the display system to perform operations comprising: scaling the first electrical stimulus of each pixel of the image former by a first light scale factor; scaling the second electrical stimulus of each pixel of the image former by a second light scale factor; and applying at least one pixel shading map to the image former to independently adjust, for each pixel of the display, the first amount relative to the second amount.

In Example 2, the subject matter of Example 1 includes, wherein: the at least one display comprises a waveguide configured to present the image from the plurality of virtual image surface locations.

In Example 3, the subject matter of Examples 1-2 includes, wherein: the image former comprises at least one liquid crystal on silicon panel configured to propagate the first light and second light of each pixel through reflection.

In Example 4, the subject matter of Examples 1-3 includes, wherein: the image former comprises an array of light emitting diodes configured to emit the first light and second light of each pixel.

In Example 5, the subject matter of Examples 1-4 includes, wherein: the at least one pixel shading map comprises a look up table comprising pixel shading values for the plurality of pixels.

In Example 6, the subject matter of Examples 1-5 includes, wherein: the first light scale factor, second light scale factor, and pixel shading map are generated by: measuring, for each virtual image surface location of a plurality of virtual image surface locations presented by a test display surface of a test display device, an amount of the first light and an amount of the second light presented from the test display surface location; and defining the first light scale factor, second light scale factor, and pixel shading map to increase uniformity of the amounts of the first light and second light presented across the plurality of virtual image surface locations.

In Example 7, the subject matter of Example 6 includes, wherein: the defining of the first light scale factor, second light scale factor, and pixel shading map to increase the uniformity of the amounts of the first light and second light presented across the plurality of virtual image surface locations comprises: defining the first light scale factor, second light scale factor, and pixel shading map to reduce a color non-uniformity measure, the color non-uniformity measure being based at least in part on a monocular non-uniformity measure representative of a difference, across the plurality of virtual image surface locations, between: the measured amounts of the first light and second light; and a white-balanced target distribution of first light and second light.

In Example 8, the subject matter of Example 7 includes, wherein: the color non-uniformity measure is based at least in part on a smoothness measure representative of a total variation in the measured amounts of the first light and second light across the plurality of virtual image surface locations.

In Example 9, the subject matter of Example 8 includes, wherein: the at least one display comprises: a left near eye display having a left image former and a left display surface configured to present the image from a plurality of left virtual image surface locations; and a right near eye display having a right image former and a right display surface configured to present the image from a plurality of right virtual image surface locations; the at least one pixel shading map comprises: a left pixel shading map for the image former of the left near eye display; and a right pixel shading map for the image former of the right near eye display; the measuring is performed for a test left near eye display and a test right near eye display of the test display device; and the color non-uniformity measure is based at least in part on a binocular rivalry measure representative of, for each of the plurality of left virtual image surface locations and corresponding right virtual image surface locations: a difference in the amounts of the first light presented by the test left near eye display and the test right near eye display at the virtual image surface location; and a difference in the amounts of the second light presented by the test left near eye display and the test right near eye display at the virtual image surface location.

Example 10 is a method for color correction of a display system, comprising: forming an image by, at each pixel of a plurality of pixels of a display of the display system: propagating a first amount of a first light having a first wavelength from a first color element of the pixel, the first amount being based on a first electrical stimulus applied to the first color element; and propagating a second amount of a second light having a second wavelength from a second color element of the pixel, the second amount being based on a second electrical stimulus applied to the second color element; presenting the image across a plurality of virtual image surface locations by propagating light from a display surface of the display; scaling the first electrical stimulus of each pixel of the image former by a first light scale factor; scaling the second electrical stimulus of each pixel of the image former by a second light scale factor; and applying at least one pixel shading map to the plurality of pixels to independently adjust, for each pixel, the first amount relative to the second amount.

In Example 11, the subject matter of Example 10 includes, wherein: the display surface comprises a surface of a waveguide, the waveguide being configured to present the image from the plurality of virtual image surface locations.

In Example 12, the subject matter of Examples 10-11 includes, wherein: the plurality of pixels comprises at least one liquid crystal on silicon panel configured to propagate the first light and second light of each pixel through reflection.

In Example 13, the subject matter of Examples 10-12 includes, wherein: the plurality of pixels comprises at least one array of light emitting diodes configured to emit the first light and second light of each pixel.

In Example 14, the subject matter of Examples 10-13 includes, wherein: the at least one pixel shading map comprises a look up table comprising pixel shading values for the plurality of pixels.

In Example 15, the subject matter of Examples 10-14 includes, generating the first light scale factor, second light scale factor, and pixel shading map by: measuring, for each virtual image surface location of a plurality of virtual image surface locations presented by a test display surface of a test display device, an amount of the first light and an amount of the second light presented from the virtual image surface location; and defining the first light scale factor, second light scale factor, and pixel shading map to increase uniformity of the amounts of the first light and second light presented across the plurality of virtual image surface locations.

In Example 16, the subject matter of Example 15 includes, wherein: the defining of the first light scale factor, second light scale factor, and pixel shading map to increase the uniformity of the amounts of the first light and second light presented across the plurality of virtual image surface locations comprises: defining the first light scale factor, second light scale factor, and pixel shading map to reduce a color non-uniformity measure, the color non-uniformity measure being based at least in part on a monocular non-uniformity measure representative of a difference, across the plurality of virtual image surface locations, between: the measured amounts of the first light and second light; and a white-balanced target distribution of first light and second light.

In Example 17, the subject matter of Example 16 includes, wherein: the color non-uniformity measure is based at least in part on a smoothness measure representative of a total variation in the measured amounts of the first light and second light across the plurality of virtual image surface locations.

In Example 18, the subject matter of Example 17 includes, wherein: the display is a left near eye display; the display system comprises the left near eye display and a right near eye display; the measuring is performed for a test left near eye display and a test right near eye display of the test display device; and the color non-uniformity measure is based at least in part on a binocular rivalry measure representative of, for each of a plurality of left virtual image surface locations of the test left near eye display and corresponding right virtual image surface locations of the test right near eye display: a difference in the amounts of the first light presented by the test left near eye display and the test right near eye display at the virtual image surface location; and a difference in the amounts of the second light presented by the test left near eye display and the test right near eye display at the virtual image surface location.

Example 19 is a method for generating color correction settings for a display system, comprising: measuring, for each virtual image surface location of a plurality of virtual image surface locations presented by a test display surface of a test display device, an amount of a first light having a first wavelength and an amount of a second light having a second wavelength presented from the virtual image surface location; and defining a first light scale factor, second light scale factor, and pixel shading map to increase uniformity of the amounts of the first light and second light presented across the plurality of virtual image surface location, the first light scale factor being configured to scale a first electrical stimulus of each pixel of an image former to modulate an amount of the first light propagated by the pixel; the second light scale factor being configured to scale a second electrical stimulus of each pixel of the image former to modulate an amount of the second light propagated by the pixel; and the pixel shading map configured to independently adjust, for each pixel of the image former, the amount of the first light relative to the amount of the second light.

In Example 20, the subject matter of Example 19 includes, wherein: the measuring is performed for a test left near eye display and a test right near eye display of the test display device; and the defining of the first light scale factor, second light scale factor, and pixel shading map to increase the uniformity of the amounts of the first light and second light presented across the plurality of virtual image surface locations comprises: defining the first light scale factor, second light scale factor, and pixel shading map to reduce a color non-uniformity measure, the color non-uniformity measure being based at least in part on: a monocular non-uniformity measure representative of a difference, across the plurality of virtual image surface locations, between: the measured amounts of the first light and second light; and a white-balanced target distribution of first light and second light; a smoothness measure representative of a total variation in the measured amounts of the first light and second light across the plurality of virtual image surface locations; and a binocular rivalry measure representative of, for each of the plurality of left virtual image surface locations of the test left near eye display and corresponding right virtual image surface locations of the test right near eye display: a difference in the amounts of the first light presented by the test left near eye display and the test right near eye display at the virtual image surface location; and a difference in the amounts of the second light presented by the test left near eye display and the test right near eye display at the virtual image surface location.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Other technical features may be readily apparent to one skilled in the art from the figures, descriptions, and claims herein.

Glossary

"Extended reality" (XR) refers, for example, to an interactive experience of a real-world environment where physical objects that reside in the real-world are "augmented" or enhanced by computer-generated digital content (also referred to as virtual content or synthetic content). XR can also refer to a system that enables a combination of real and virtual worlds, real-time interaction, and 3D registration of virtual and real objects. A user of an XR system perceives virtual content that appears to be attached to, or interacts with, a real-world physical object.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A display system, comprising:
   at least one display comprising:
   an image former comprising a plurality of pixels configured to form an image, each pixel comprising:
   a first color element configured to propagate a first amount of a first light having a first wavelength, the first amount being based on a first electrical stimulus applied to the first color element; and
   a second color element configured to propagate a second amount of a second light having a second wavelength, the second amount being based on a second electrical stimulus applied to the second color element; and
   a display surface configured to present the image across a plurality of virtual image surface locations;
   at least one processor; and
   a memory storing instructions that, when executed by the at least one processor, configure the display system to perform operations comprising:
   scaling the first electrical stimulus of each pixel of the image former by a first light scale factor;
   scaling the second electrical stimulus of each pixel of the image former by a second light scale factor; and
   applying at least one pixel shading map to the image former to independently adjust, for each pixel of the display, the first amount relative to the second amount,
   wherein:
   the first light scale factor, the second light scale factor, and the at least one pixel shading map are generated by:
   measuring, for each virtual image surface location of a plurality of virtual image surface locations presented by a test display surface of a test display device, an amount of the first light and an amount of the second light presented from the test display surface location; and
   defining the first light scale factor, the second light scale factor, and the at least one pixel shading map to increase uniformity of the amounts of the first light and second light presented across the plurality of virtual image surface locations.

2. The display system of claim 1, wherein:
the at least one display comprises a waveguide configured to present the image from the plurality of virtual image surface locations.

3. The display system of claim 1, wherein:
the image former comprises at least one liquid crystal on silicon panel configured to propagate the first light and second light of each pixel through reflection.

4. The display system of claim 1, wherein:
the image former comprises an array of light emitting diodes configured to emit the first light and second light of each pixel.

5. The display system of claim 1, wherein:
the at least one pixel shading map comprises a look up table comprising pixel shading values for the plurality of pixels.

6. The display system of claim 1, wherein:
the defining of the first light scale factor, the second light scale factor, and the at least one pixel shading map to increase the uniformity of the amounts of the first light and second light presented across the plurality of virtual image surface locations comprises:
defining the first light scale factor, the second light scale factor, and the at least one pixel shading map to reduce a color non-uniformity measure, the color non-uniformity measure being based at least in part on a monocular non-uniformity measure representative of a difference, across the plurality of virtual image surface locations, between:
the measured amounts of the first light and second light; and
a white-balanced target distribution of first light and second light.

7. The display system of claim 6, wherein:
the color non-uniformity measure is based at least in part on a smoothness measure representative of a total variation in the measured amounts of the first light and second light across the plurality of virtual image surface locations.

8. The display system of claim 7, wherein:
the at least one display comprises:
- a left near eye display having a left image former and a left display surface configured to present the image from a plurality of left virtual image surface locations; and
- a right near eye display having a right image former and a right display surface configured to present the image from a plurality of right virtual image surface locations;

the at least one pixel shading map comprises:
- a left pixel shading map for the image former of the left near eye display; and
- a right pixel shading map for the image former of the right near eye display;

the measuring is performed for a test left near eye display and a test right near eye display of the test display device; and the color non-uniformity measure is based at least in part on a binocular rivalry measure representative of, for each of the plurality of left virtual image surface locations and corresponding right virtual image surface locations:
- a difference in the amounts of the first light presented by the test left near eye display and the test right near eye display at the virtual image surface location; and
- a difference in the amounts of the second light presented by the test left near eye display and the test right near eye display at the virtual image surface location.

9. A method for color correction of a display system, comprising:
measuring, for each virtual image surface location of a plurality of virtual image surface locations presented by a test display surface of a test display device, an amount of a first light having a first wavelength and an amount of a second light having a second wavelength presented from the virtual image surface location;
defining a first light scale factor, a second light scale factor, and at least one pixel shading map to increase uniformity of the amounts of the first light and second light presented across the plurality of virtual image surface locations;
forming an image by, at each pixel of a plurality of pixels of a display of the display system:
propagating a first amount of the first light from a first color element of the pixel, the first amount being based on a first electrical stimulus applied to the first color element; and
propagating a second amount of the second light from a second color element of the pixel, the second amount being based on a second electrical stimulus applied to the second color element;
presenting the image across a plurality of virtual image surface locations by propagating light from a display surface of the display;
scaling the first electrical stimulus of each pixel of the image former by the first light scale factor;
scaling the second electrical stimulus of each pixel of the image former by the second light scale factor; and
applying the at least one pixel shading map to the plurality of pixels to independently adjust, for each pixel, the first amount relative to the second amount.

10. The method of claim 9, wherein:
the display surface comprises a surface of a waveguide, the waveguide being configured to present the image from the plurality of virtual image surface locations.

11. The method of claim 9, wherein:
the plurality of pixels comprises at least one liquid crystal on silicon panel configured to propagate the first light and second light of each pixel through reflection.

12. The method of claim 9, wherein:
the plurality of pixels comprises at least one array of light emitting diodes configured to emit the first light and second light of each pixel.

13. The method of claim 9, wherein:
the at least one pixel shading map comprises a look up table comprising pixel shading values for the plurality of pixels.

14. The method of claim 9, wherein:
the defining of the first light scale factor, the second light scale factor, and the at least one pixel shading map to increase the uniformity of the amounts of the first light and second light presented across the plurality of virtual image surface locations comprises:
defining the first light scale factor, the second light scale factor, and the at least one pixel shading map to reduce a color non-uniformity measure, the color non-uniformity measure being based at least in part on a monocular non-uniformity measure representative of a difference, across the plurality of virtual image surface locations, between:
the measured amounts of the first light and second light; and
a white-balanced target distribution of first light and second light.

15. The method of claim 14, wherein:
the color non-uniformity measure is based at least in part on a smoothness measure representative of a total variation in the measured amounts of the first light and second light across the plurality of virtual image surface locations.

16. The method of claim 15, wherein:
the display is a left near eye display;
the display system comprises the left near eye display and a right near eye display;
the measuring is performed for a test left near eye display and a test right near eye display of the test display device; and
the color non-uniformity measure is based at least in part on a binocular rivalry measure representative of, for each of a plurality of left virtual image surface locations of the test left near eye display and corresponding right virtual image surface locations of the test right near eye display:
a difference in the amounts of the first light presented by the test left near eye display and the test right near eye display at the virtual image surface location; and
a difference in the amounts of the second light presented by the test left near eye display and the test right near eye display at the virtual image surface location.

17. A method for generating color correction settings for a display system, comprising:
measuring, for each virtual image surface location of a plurality of virtual image surface locations presented by a test display surface of a test display device, an amount of a first light having a first wavelength and an amount of a second light having a second wavelength presented from the virtual image surface location; and defining a first light scale factor, a second light scale factor, and at least one pixel shading map to increase uniformity of the amounts of the first light and second light presented across the plurality of virtual image surface locations, the first light scale factor being configured to scale a first electrical stimulus of each pixel of an image former of the display system to modulate an amount of the first light propagated by the pixel;

the second light scale factor being configured to scale a second electrical stimulus of each pixel of the image former to modulate an amount of the second light propagated by the pixel; and the at least one pixel shading map configured to independently adjust, for each pixel of the image former, the amount of the first light relative to the amount of the second light.

18. The method of claim 17, wherein:

the measuring is performed for a test left near eye display and a test right near eye display of the test display device; and the defining of the first light scale factor, the second light scale factor, and the at least one pixel shading map to increase the uniformity of the amounts of the first light and second light presented across the plurality of virtual image surface locations comprises:

defining the first light scale factor, the second light scale factor, and the at least one pixel shading map to reduce a color non-uniformity measure, the color non-uniformity measure being based at least in part on:

a monocular non-uniformity measure representative of a difference, across the plurality of virtual image surface locations, between:

the measured amounts of the first light and second light; and a white-balanced target distribution of first light and second light;

a smoothness measure representative of a total variation in the measured amounts of the first light and second light across the plurality of virtual image surface locations; and a binocular rivalry measure representative of, for each of the plurality of left virtual image surface locations of the test left near eye display and corresponding right virtual image surface locations of the test right near eye display:

a difference in the amounts of the first light presented by the test left near eye display and the test right near eye display at the virtual image surface location; and a difference in the amounts of the second light presented by the test left near eye display and the test right near eye display at the virtual image surface location.

19. The method of claim 17, wherein:

the display system comprises a waveguide configured to present the image from the plurality of virtual image surface locations.

20. The method of claim 17, wherein:

the at least one pixel shading map comprises a look up table comprising pixel shading values for individual pixels of the image former.

* * * * *